United States Patent
Alao

(10) Patent No.: US 10,422,312 B2
(45) Date of Patent: Sep. 24, 2019

(54) ENERGY STORAGE AND GENERATION SYSTEM

(71) Applicant: Olalekan A. Alao, Aurora, IL (US)

(72) Inventor: Olalekan A. Alao, Aurora, IL (US)

(*) Notice: Subject to any disclaimer, the term of this patent is extended or adjusted under 35 U.S.C. 154(b) by 0 days.

(21) Appl. No.: 15/371,429

(22) Filed: Dec. 7, 2016

(65) Prior Publication Data
US 2018/0156184 A1 Jun. 7, 2018

(51) Int. Cl.
*F03B 13/06* (2006.01)
*F03B 15/06* (2006.01)
*H02J 15/00* (2006.01)

(52) U.S. Cl.
CPC ............. *F03B 13/06* (2013.01); *F03B 15/06* (2013.01); *H02J 15/006* (2013.01); *F05B 2220/32* (2013.01); *F05B 2220/706* (2013.01); *F05B 2260/42* (2013.01); *Y02E 10/22* (2013.01); *Y02E 10/226* (2013.01); *Y02E 10/28* (2013.01); *Y02E 60/17* (2013.01); *Y02P 70/525* (2015.11)

(58) Field of Classification Search
CPC ......... F03B 13/06; F03B 15/06; F03B 17/061
See application file for complete search history.

(56) References Cited

U.S. PATENT DOCUMENTS

| | | | |
|---|---|---|---|
| 3,939,356 A | 2/1976 | Loane | |
| 2002/0144504 A1* | 10/2002 | Merswolke | F03D 9/008 60/398 |
| 2009/0021012 A1 | 1/2009 | Stull | |
| 2014/0238020 A1* | 8/2014 | Piskorz | F02C 6/16 60/652 |
| 2015/0176559 A1* | 6/2015 | Hongawa | F03B 3/10 60/398 |
| 2016/0076509 A1* | 3/2016 | Im | F03B 13/06 60/398 |
| 2016/0333844 A1* | 11/2016 | Bogorodsky | C02F 1/58 |
| 2016/0341173 A1* | 11/2016 | Coulon | F03B 3/10 |
| 2017/0082123 A1* | 3/2017 | Momen | F03B 1/02 |

* cited by examiner

*Primary Examiner* — Sean Gugger
(74) *Attorney, Agent, or Firm* — Mathew R. P. Perrone, Jr.; Joseph J. Whang; Genna S. Hibbs

(57) ABSTRACT

An energy storage and generation system uses a combination of compressed air energy storage systems and fluid energy systems, to store energy producing capability at a time when electricity requirements are low, to release that stored energy producing capability at a time when electricity requirements are high.

7 Claims, 32 Drawing Sheets

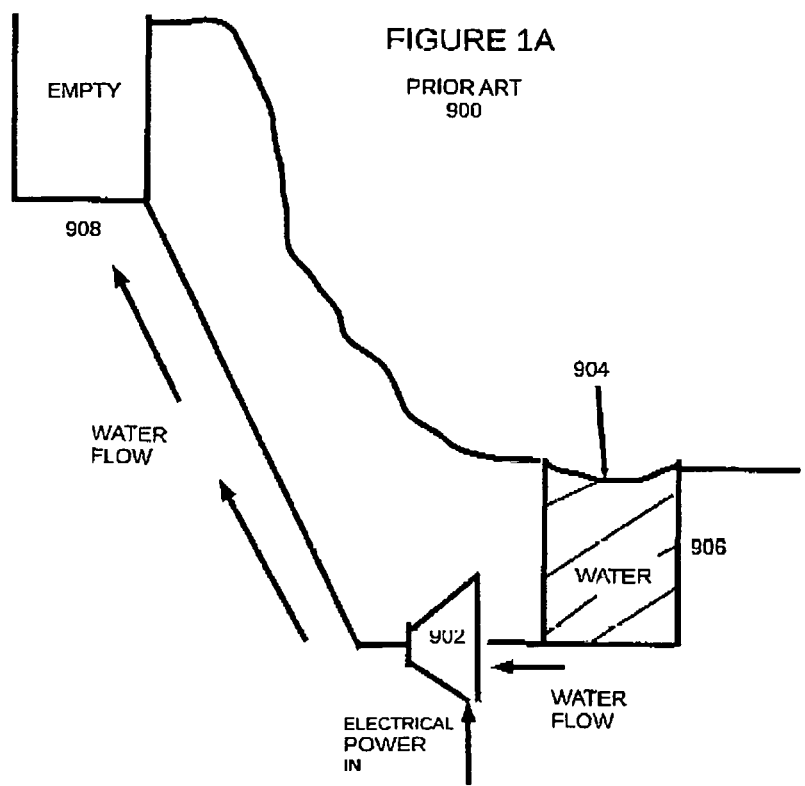

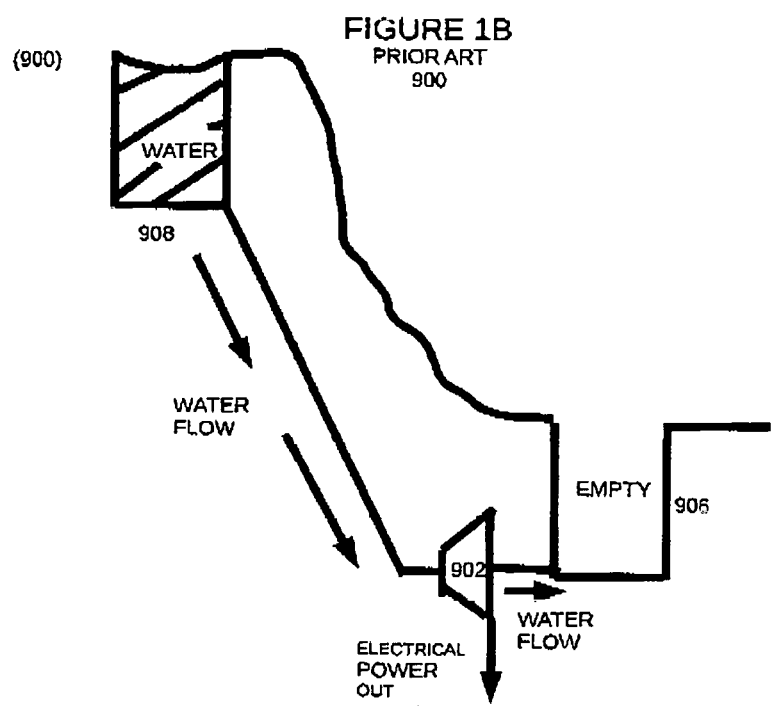

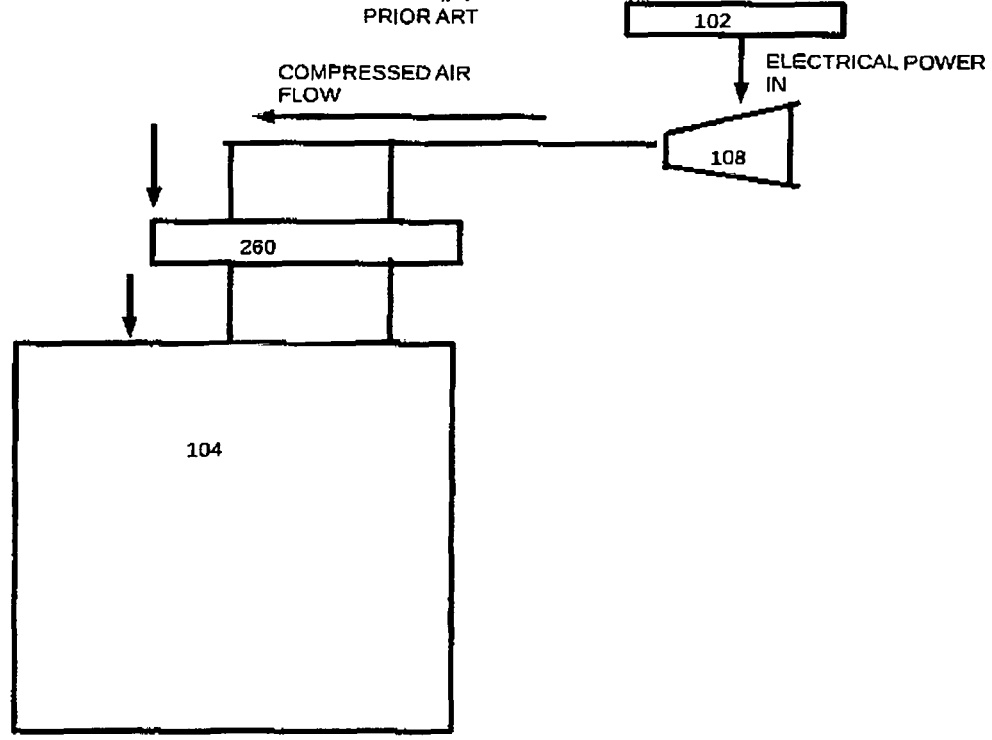

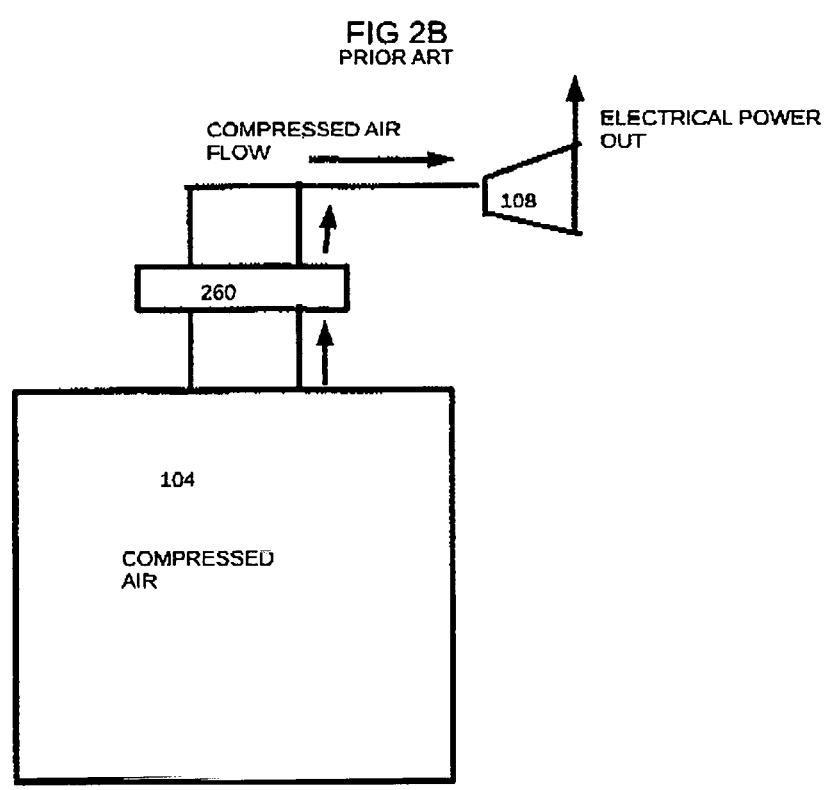

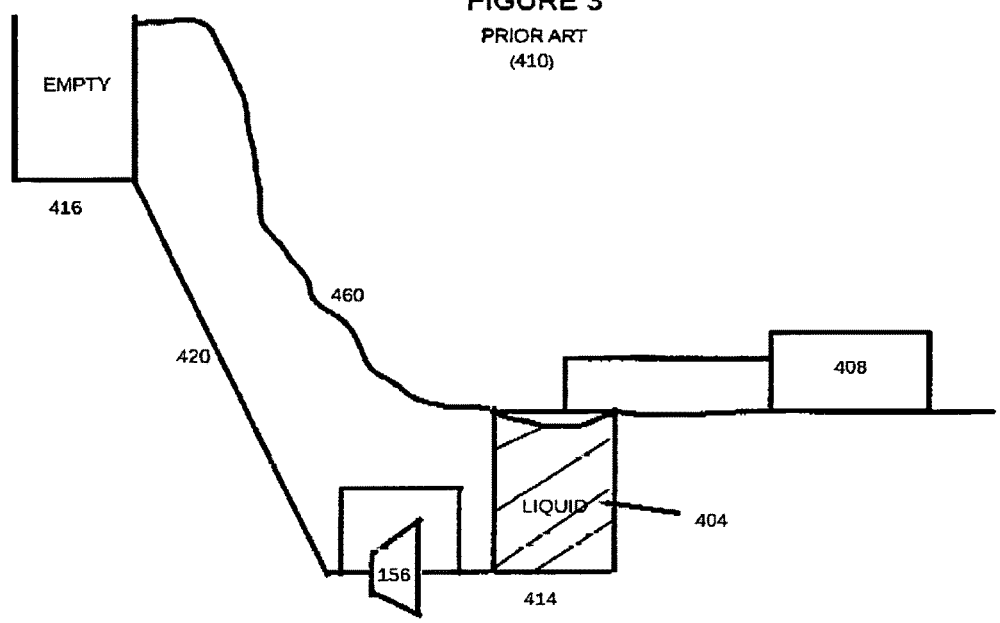

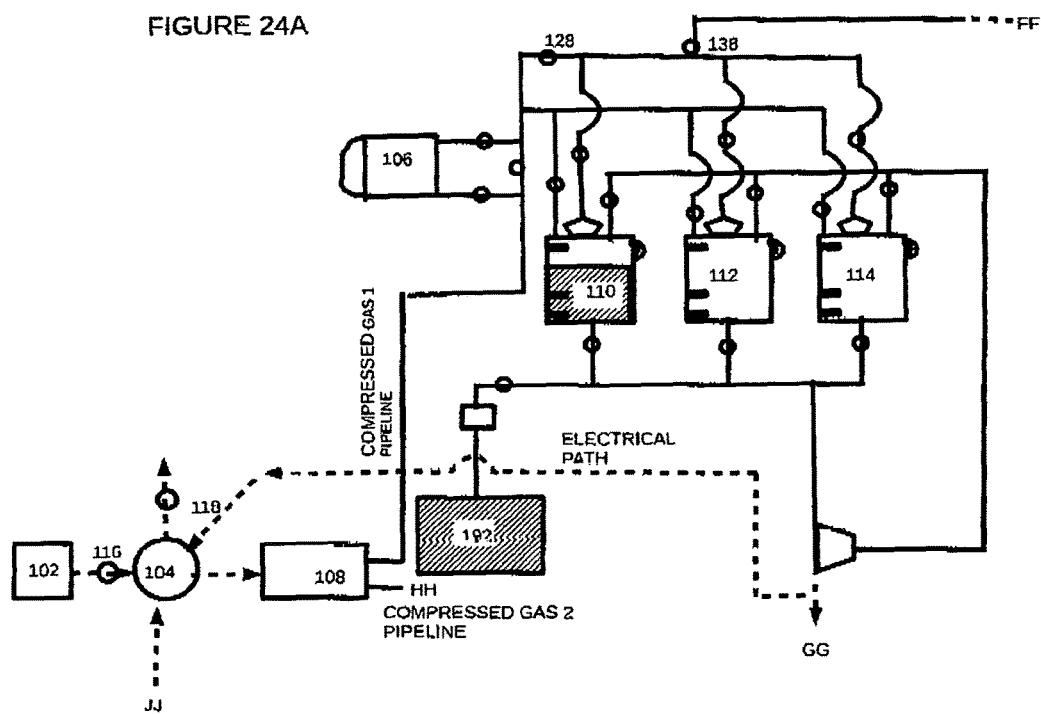

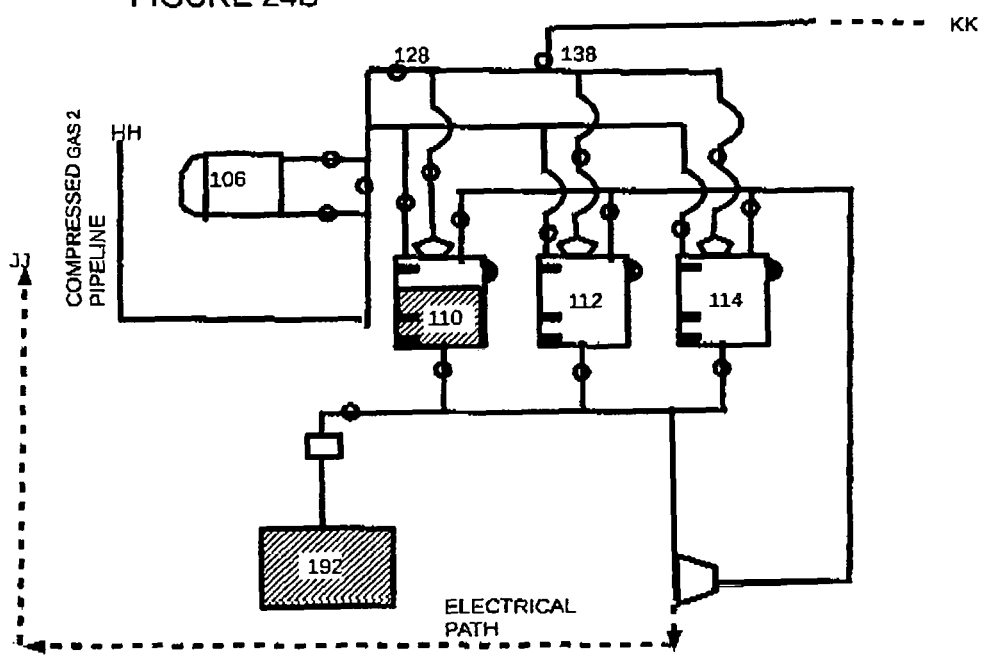

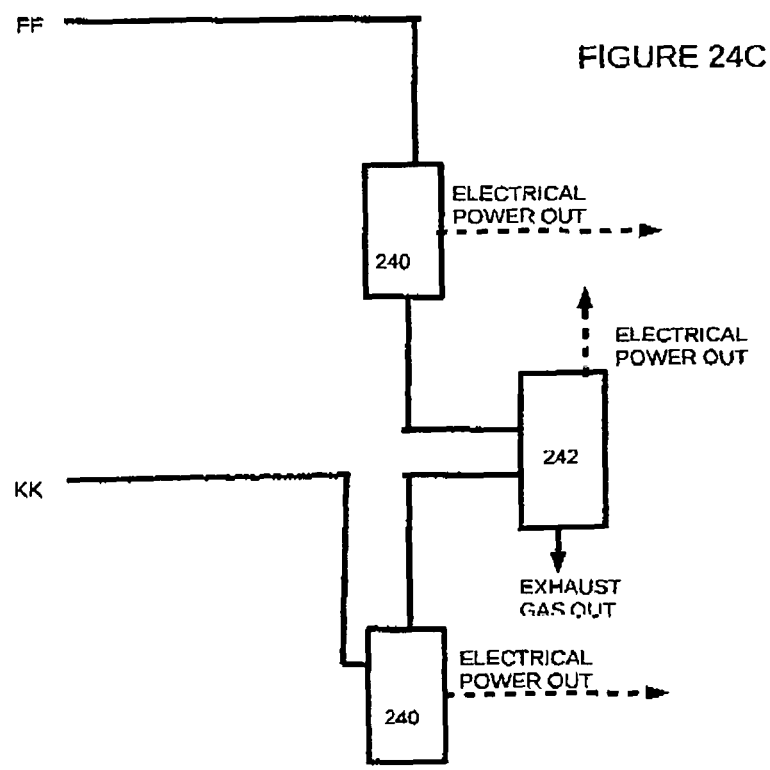

ENERGY STORAGE AND GENERATION SYSTEM

CROSS REFERENCE TO RELATED APPLICATIONS

This application claims priority of and is based on U.S. Provisional Patent Application Ser. No. 62/387,805, filed Jan. 5, 2016; U.S. Provisional Patent Application Ser. No. 62/390,026, filed Mar. 16, 2016; and U.S. Provisional Patent Application Ser. No. 62/392,026, filed May 19, 2016; all of these applications being incorporated herein by reference, and filed by the same inventive entity.

This invention relates to an energy storage and generation system and more particularly to an energy storage and generation system, which combines various energy generating mechanisms with a compressed gas energy storage mechanisms, which uses at least one compressed gas and at least one liquid to store energy for release at an appropriate time to enhance energy efficiency.

BACKGROUND OF THE INVENTION

Electrical energy is the life blood of modern society. However, current systems focus upon maximizing the production of electrical energy solely for certain times of peak consumption and fails to efficiently utilize electrical production capacity outside of those times of peak consumption through the use of storage mechanisms. As such, the need becomes apparent for a means of storing electrical energy in those moments outside of times of peak consumption and to then release the stored energy when demand becomes higher, thereby alleviating energy production demand.

Another important aspect of meeting energy demand, is cost. Energy production costs not only include the costs expended in the generation and storage of power, but also the not so apparent ancillary costs of energy generation and storage on the environment.

A number of systems in the prior art are devised to address some of the known environmental problems with energy generation and storage. Some of these systems includes batteries, flow batteries, fuel cells, super capacitors, superconducting magnetic energy storage, compressed air energy storage, flywheel energy storage, hydroelectric energy storage and gravitational potential energy devices. Each of the abovementioned systems have their advantages and disadvantages. However, capacity and efficiency are limiting factors which reduce the practical utility of most of these systems.

The most common electrical production system which addresses known problems in the art of efficiency and environmental costs is the hydroelectric energy storage system. This system stores energy by pumping water from a lower elevation to a higher elevation (reference to FIG. 1) during periods outside of peak energy demand. During periods of peak energy demand, this system releases the potential energy of the stored water at higher elevation through the use of gravity to drive water through turbines and lower elevation resorvoirs, generating power.

Hydroelectric Energy Storage system addresses the problems of energy capacity, energy efficiency, and ancillary environmental costs, but fails to meet the direct, upfront cost efficiency goals of construction. Furthermore, the Hydroelectric Energy Storage system is limited by the need of a large body of water or a large variation in height. Likewise, other energy storage systems face other inefficiencies.

Conferences considering climate change include the United Nations (UN) Climate Change Conference held in Paris, France, from 30 November to 12 December 2015, having, as its objective, the achievement for the first time in over 20 years of UN negotiations, a binding and universal agreement on climate from all nations of the world. Pope Francis concurs in such actions as evidenced by the publication of an encyclical, "Laudato si" which calls for action against climate change with the intention in part to influence the conference. The International Trade Union Conference also follows the goal of the conference to be "zero carbon, zero poverty". Furthermore quoting from general secretary of that conference "there are no jobs on a dead planet."

Adverse impact to the environment from energy production is not limited to global warming and pollutions from greenhouse gases and other such pollutants, but also other serious issues such as the risk of exposure and contamination from other sources such as radioactive, chemical and radio frequency sources (Wikipedia—2015 United Nations Climate Change Conference).

Flywheel energy storage can potentially have a high efficiency up to 90%, but maintaining this efficiency over time can be an issue. Moreover, high tech systems with superconducting bearings suffer from flux creep during operation. Accordingly, the need for new energy storage systems that can better store and recover energy still remains.

SUMMARY OF THE INVENTION

Among the many objectives of this invention is the provision of an energy storage and generation system, which stores energy for future use.

A further objective of this invention is the provision of an energy storage and generation system, which produces desired energy when it is required.

Yet a further objective of this invention is the provision of an energy storage and generation system, which efficiently produces desired energy.

A still further objective of this invention is the provision of an energy storage and generation system, which permits recovery of energy.

Also a further objective of this invention is the provision of an energy storage and generation system, which permits recovery of more energy than is recovered in a prior art energy storage and generation system.

These and other objectives of the invention (which other objectives become clear by consideration of the specification, claims and drawings as a whole) are met by providing an energy storage and generation system, which uses a combination of compressed air energy storage systems and fluid energy systems, to store energy producing capability at a time when electricity requirements are low, to release that stored energy producing capability at a time when electricity requirements are high.

BRIEF DESCRIPTION OF THE DRAWINGS

FIG. 1 depicts a conventional pumped storage hydroelectricity device 900 of the prior art.

FIG. 2 depicts a simplified compressed air storage system 802 for energy for energy storage system 100.

FIG. 3 depicts a conventional pumped storage hydroelectricity device 900 of the prior art, which uses at least one compressed gas and at least one liquid to store energy for release at an appropriate time to enhance energy efficiency for energy storage system 100.

FIG. 24 depicts energy storage system 100 of this invention when the gas supply device 108 is electrolytic.

Throughout the figures of the drawings, where the same part appears in more than one figure of the drawings, the same number is applied thereto.

DESCRIPTION OF THE PREFERRED EMBODIMENTS

Figure 4:
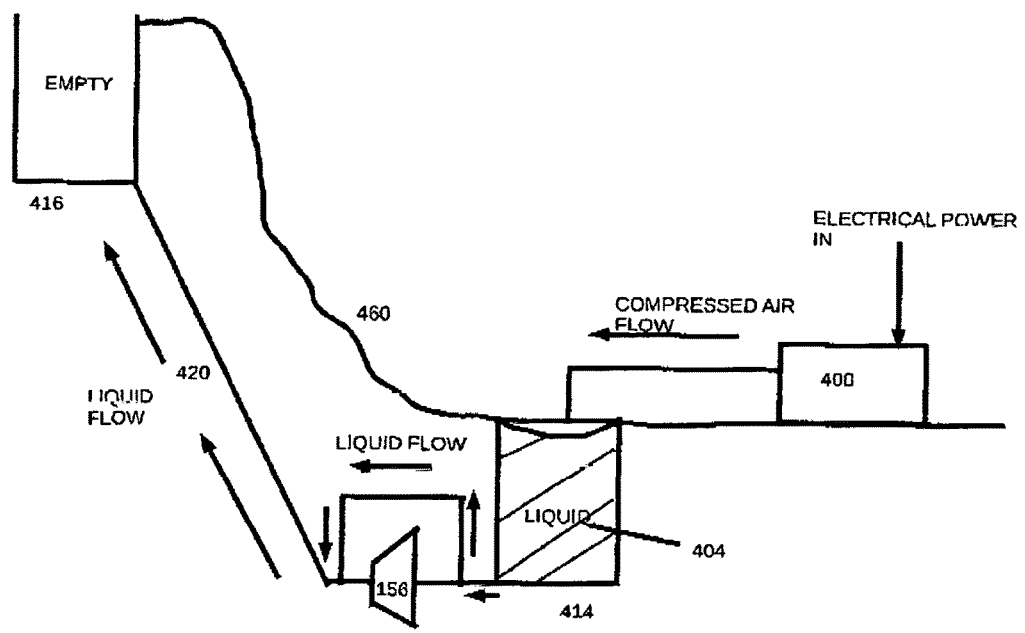
FIG. 4 depicts a conventional pumped storage hydroelectricity device 900 of the prior art of FIG. 3 using a pumped storage hydroelectric system 400 combined with the compressed air energy storage system 230 to form a first single system 240 that is more efficient than either of the two systems, as open systems in that the output of the pumped storage hydroelectric system 400 and compressed air energy storage system 230 are not used as a feedback to the energy storage and generation system 200.

Compressed Air Energy Storage Systems are known energy storage systems whereby air is compressed and stored in a chamber at a lower elevation until electricity generation is required (hereinafter referred to as CAES). On demand, the compressed air is heated and expanded in an expansion turbine to generate electricity. By combining systems to work in tandem with CAES, cost reduction goals and environmental impact goals can be met. The enclosed figures and discussion are intended to explain the concept behind energy storage and generation system of this invention.

The number of vessels depends on the electric contemplated as needed. As the electicity required increases, the number of vessels in the system increases proportionally. As the electicity required decreases, the number of vessels in the system decreases proportionally. The vessels store or contain the liquid or compressed gas as required for the functioning of the system.

The present invention includes a system that stores energy and produces electricity by incorporating a combination of compressed gas and liquids (water, oil and the like) in the system. The drawings explain the concept behind energy storage and generations systems. The application of the system is not limited to these drawings alone. The following are some other variants:

combination of the system with other energy storage systems;

combination with a variant of itself to facilitate operation in the compression and generation mode simultaneously for continuous running operation;

combination with systems designed to capture heat generated during compression and use the heat recovered to heat the air during expansion; and modification of the system to handle high pressures of fluids and other exceptional parameters.

These are the descriptions of the various elements or devices contained in the drawings:

the external electrical power source 102;

the electrical integrating device 104;

the receiving vessel 106, which can be as simple as an air receiver in the case where compressed air is used;

the gas supply device 108, which is preferably reversible and can be, but is not limited to, air compressor, cryogenic cooling systems or electrolytic systems or any other devices or systems used to produce compressed gas or cryogenic fluids or solids;

vessels 110, 112, 114, 194, 196, 253, 256, which are used to contain the working fluids for energy storage and generation system 100, and which can be as simple as pressure vessels, reservoirs, underground caverns or anything else that fulfills their purpose as described in the system operations;

electrical switches 116, 118, and 120 which can be electronically controlled;

valves 122, 124, 126, 128, 130, 132, 134, 136, 138, 140, 142, 144, 146, 148, 150, 152, 154, 188, 198, 200, 202, 204, 206, 208, 222, 232, 234, 250, 252, 262, 264, which can be, but are not limited to, pilot valves, cam operated poppet valves, rotary valves, hydraulically or pneumatically actuated valves and electronically actuated valves or any combination thereof;

hydroturbine generators 156, 251, or 902, which are used in various embodiments for energy storage and generation system 100, as well as any other devices that can produce electricity using the flow of a liquid, the different numbers being designed to show a particaluar use for a particular system and the possibility of a different device to produce electricity;

venting devices 158, 160, 162, 220, or 230, which can be used to vent the vessels 110, 112, 114, 194,196, 253, 256, in which they are fitted, to the atmosphere; with an electronically controlled system, or an air valve, while having a primary function of allowing proper displacement of air when pressure vessels 110, 112, 114, 194 or 196 are receiving liquid;

sensors 164, 166, 168, 170, 172, 174, 176, 178, 180, 214, 216, 218, 224, 226, or 228, which sense when the level of the liquid in the vessels 110, 112, 114, 194, 196, 253, or 256 are at a predetermined point and to communicate this information to the device controlling the system processes which can be, but not limited to a programmable controller, a host computer or computers comprising a processor or processors in electronic communication (local or remote) with one or more computer-readable mediums, the computer storage mediums having stored thereon one or more codes to instruct the processor to receive signal from the various sensors in the system to monitor the various parameters of the system and to control one or more system elements in response to the parameters or in response to other instructions from the codes;

pressure sensing devices 182, 184, 186, 210, and 212 record the gas pressure within the vessels 110, 112, 114, 194, 196, 253, or 256, on which they are fitted, which is then communicated to the device controlling the energy storage and generation system 100, which can be, but is not limited to, a programmable controller, a host computer or computers comprising a processor or processors in electronic communication (local or remote) with one or more computer or other readable mediums, the computer storage mediums having stored thereon one or more codes to instruct the processor to receive signal from the various sensors in the system to monitor the various parameters of the system and to control one or more system elements in response to the parameters or in response to other instructions from the codes;

pumps 190, 236, 254 transfer liquid from the reservoirs into any of the vessels desired as described in the operations of energy storage and generation system 100;

reservoirs 192 and 238 hold the liquids used in the energy storage and generation system 100;

gas power generator 240, which is a device that can use compressed air to generate electricity;

reaction generator 242, which is a device that can combine two different gases chemically or otherwise and produce electricity as a result of this combination;

gas receiver 244;

cryogenic container 246 with heat exchanging devices or coils fitted in it or around its walls in such a way that it can absorbs heat from the reservoir 248 to convert the cryogenic fluids or solids to gas at high pressure, with the medium used in the heat exchanging coils or devices being a gas or a liquid;

heat reservoir 248 containing ambient air, the ground, a large body of water or any heat generating body, with the reservoir 248 must be at a reasonably higher temperature than the cryogenic fluids or solids;

the hot liquid reservoir 258;

heat exchanger 260;

heat exchanger pump 266.

In FIG. 1, which demonstrates the prior art, water storage system 900 uses reversible turbine 902 to pump water 904 from lower container 906 to upper container 908. When desired, water 904 is released from upper container 908 to pass through reversible turbine 902, thereby generating electricity. Pumping from lower container 906 to upper container 908 occurs when there is low demand or an offpeak demand for electricity. With the water 904 in upper container 908, it may be released to pass through turbine 902 and generate electricity during periods of high demand. The great volume of water 904 required for this process is one of the main reasons this process is not efficient.

With FIG. 2, the function of the energy storage and generation system 100, has one embodiment as electrical integrating device 404, which integrates electrical power from the external electrical power source 102 and those generated by the hydroturbine generator 156 in such a way that all the power generated from the hydroturbine generator 156 is used in running the gas supply device 108 and any extra power needed for this purpose is then taken from the external power source 102. The electrical integrating device 404 is also used to supply power from the gas supply device 108 to an external load when the gas supply device 108 is running in reversible mode. The electrical integrating device 404 can be as simple as a set of diodes, transistors and switches or it can be a more sophisticated electronic device.

Figure 5:
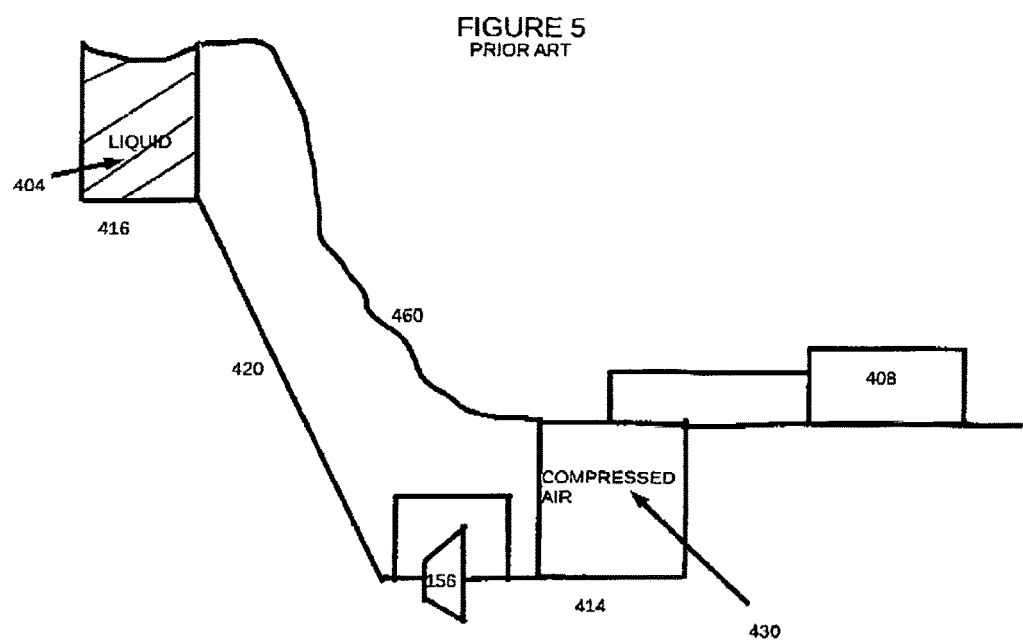
FIG. 5 a conventional pumped storage hydroelectricity device 900 of FIG. 4 as modified.

FIG. 3, FIG. 4, FIG. 5, FIG. 6, and FIG. 7 combine to show how a conventional pumped storage hydroelectricity device 900 can be combined with the simplified compressed air circuit 410 to show one version of energy storage system 100 to form a single system that will be more efficient than either of the two systems working independently. In FIG. 4, electrical power is fed to the reversible compressor 108 or expander and compressed air flows down the pipeline forcing the liquid in the lower reservoir 414 up into the upper reservoir 416. At the completion of the process, the lower reservoir 414 now contains compressed air while the upper reservoir 416 will contain the liquid or water 904 as shown in FIG. 5.

Figure 6:
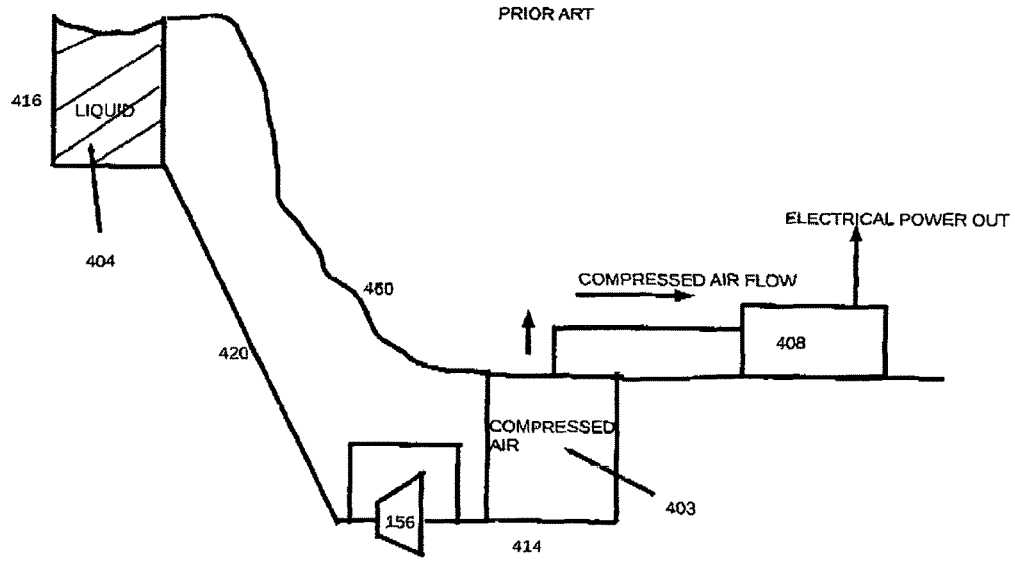
FIG. 6 depicts a conventional pumped storage hydroelectricity device 900 of FIG. 4 as modified.
Figure 7:
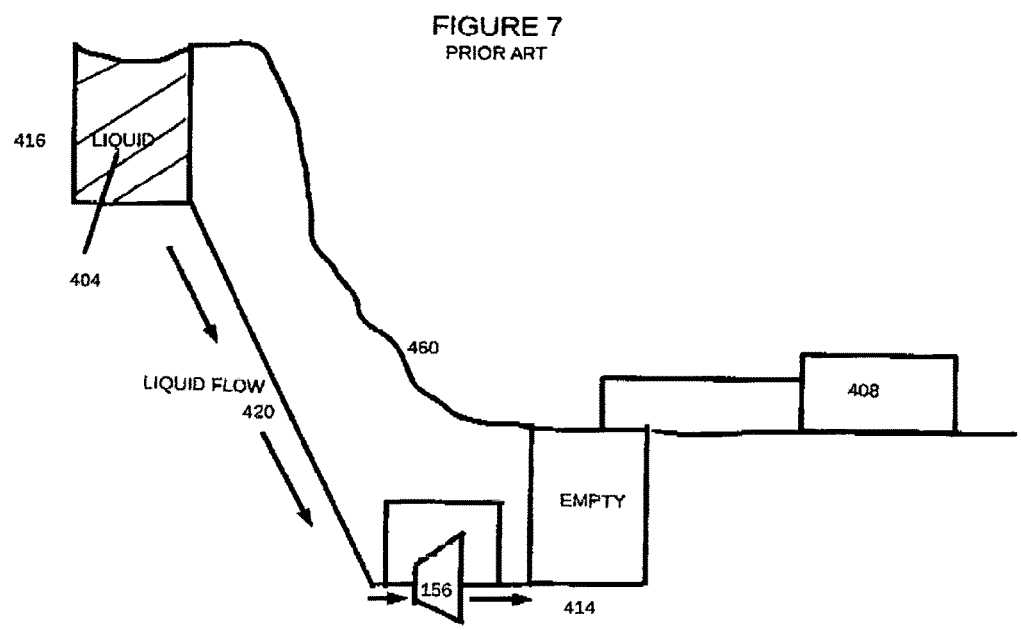
FIG. 7 depicts a conventional pumped storage hydroelectricity device 900 of FIG. 4 as modified.
Figure 8:
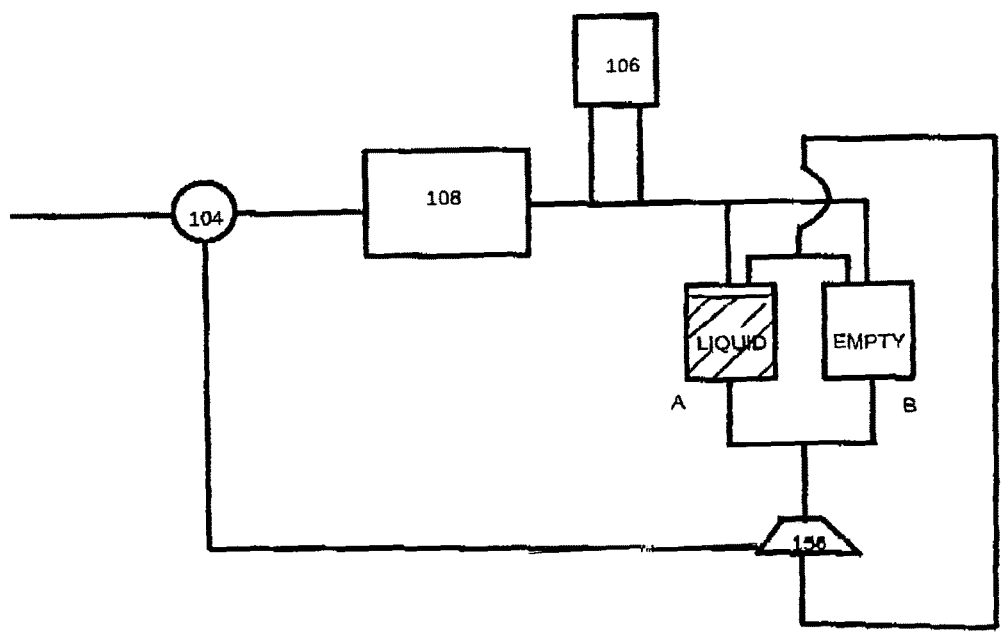
FIG. 8 depicts an upgraded or improved system as a first closed system 300, wherein output from the system is utilized in a feedback arrangement in order to provide a dramatic improvement in the overall system efficiency for energy storage system 100.

When the time comes to utilize the energy that is being stored in this way, the compressed air in the lower reservoir 414 is passed back through the pipeline 420 into the reversible compressor 108 or expander. The compressor 108 generates electricity in this process which is called generation stage 430 as shown in FIG. 6. When the compressed air is being depleted, the liquid in the upper reservoir 416 now runs down through the pipeline as shown in FIG. 7, the hydroturbine generator 156 generating electricity in the process. This is called the generation stage 2. All this systems are called open systems in that the output of the systems are not used as a feedback to the system.

FIGS. 8 through 25 cover the invention of this application, while FIGS. 1 through 7 depict the prior art. The compressed liquid and compressed gas use of FIGS. 8 through 25 are far more efficient than the arrangement of the prior art.

Figure 9:
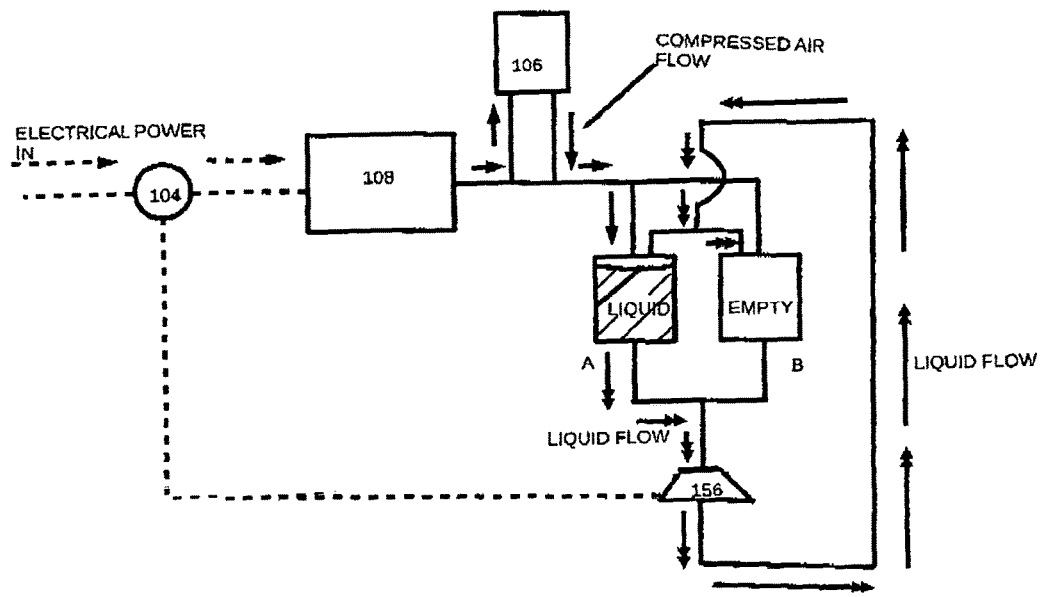
FIG. 9 depicts an upgraded or improved system as a first closed system 300 of FIG. 8 as modified.

FIG. 8, FIG. 9, FIG. 10, and FIG. 11 combine to show an upgraded or improved system for energy storage system 100 that is a closed system 320, which means output from the closed system 320 is utilized in a feedback arrangement that will result in a dramatic improvement in the overall system efficiency. In FIG. 9, electrical power from an external source is fed through the integrating device 104 to the reversible compressor 108. The function of the integrating device 104 is to integrate electrical power from the external electrical power source 102 and that power generated by the hydroturbine generator 156, in such a way that all of the power generated from the hydroturbine generator 156 is used in running the compressor 108 and any extra power needed for this purpose is then taken from the external power source 102.

Figure 10:
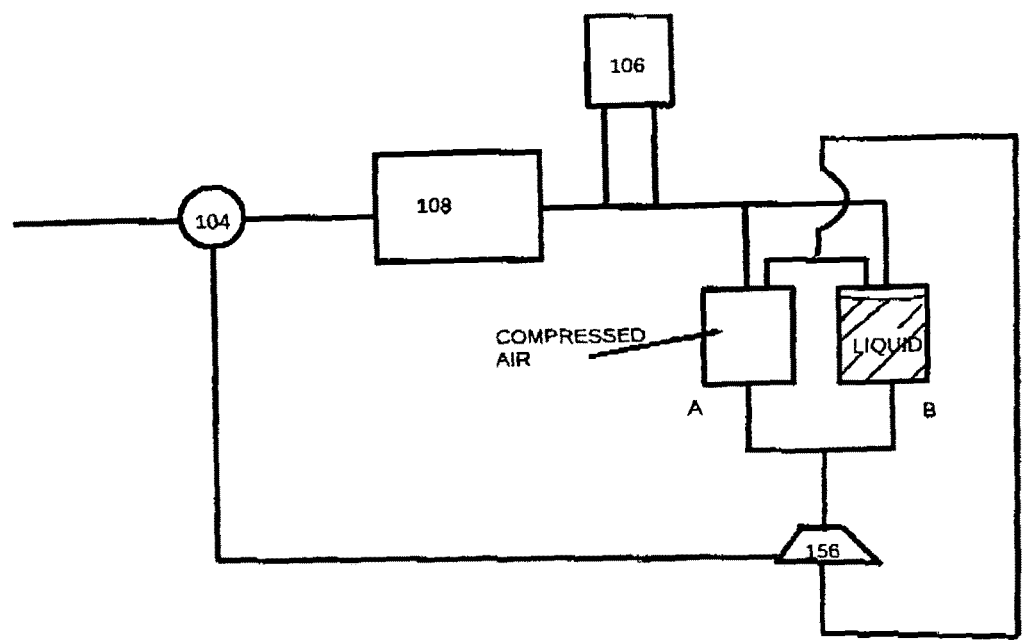
FIG. 10 depicts an upgraded or improved system as a first closed system 300 of FIG. 8 as modified.
Figure 11:
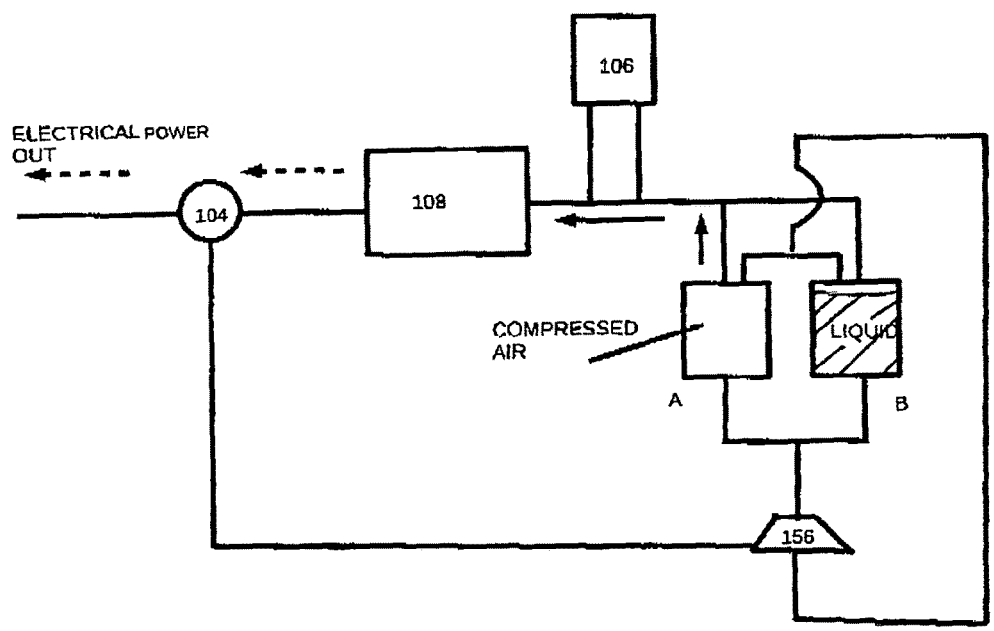
FIG. 11 depicts an upgraded or improved system as a first closed system 300 of FIG. 8 as modified.

The compressed air generated flows through pipe 516 into the air receiver 508 and then into first vessel 520 which is filled with liquid. The pressure of the air forces the liquid through the hydroturbine into second vessel 522 as shown in FIG. 10. Electrical power is generated by the hydroturbine generator 156. Then this power is looped back or recycled through the integrating device 104 to assist in powering the expander or reversible compressor 108.

At the completion of the process, first vessel 520 now contains compressed air while vessel B (which before was empty) now contains liquid as shown in FIG. 10. When the energy stored is needed, the compressed air in vessel A is directed as shown by the solid arrows in FIG. 11 to the reversible compressor 108, generating electrical power (depicted by the dashed arrows) in the process.

Figure 12:
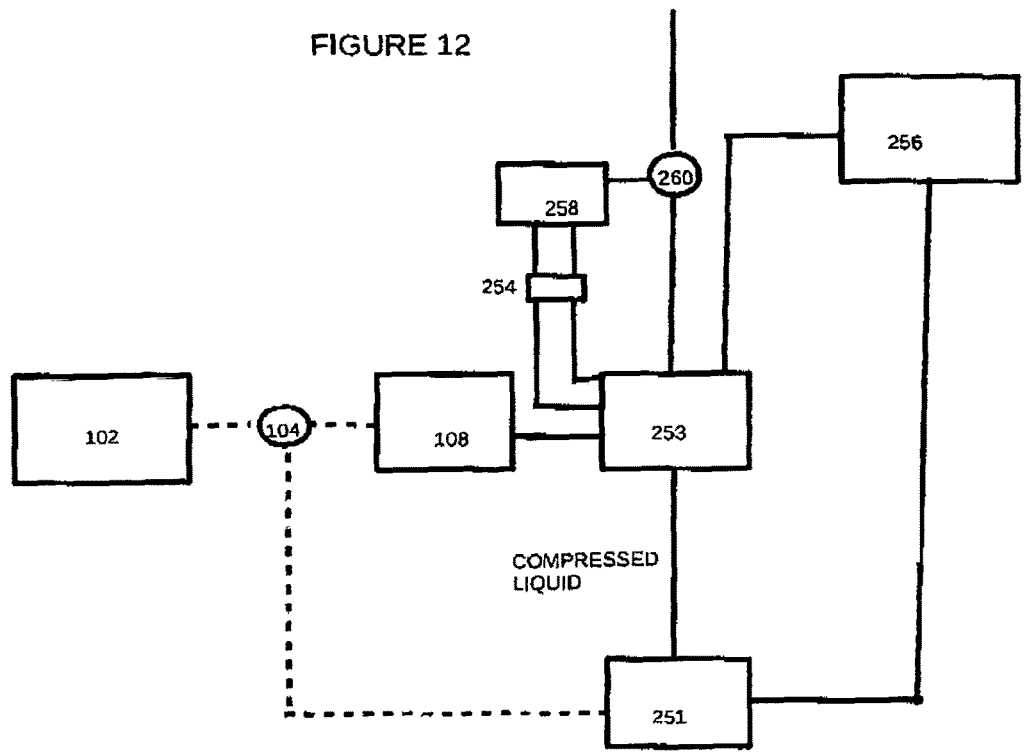
FIG. 12 depicts another embodiment of general description of the first closed system 300 of FIG. 8 as modified.

Referring now to FIG. 12, the external power source 102 initially powers the compressor 108 which compresses the liquid in pressure vessel 253, the compressed liquid then goes through the hydroturbine generator 156 to the pressure vessel 256. In the process electricity is produced by the hydroturbine generator 156 and this is subsequently used to power the compressor 108 through the changeover switch or integrating device 104 which cuts off power from the external power source at the same time. At a predetermined time when liquid in vessel is sufficiently low, pump 254 comes on to recycle some of the liquid in vessel 253 such that it flows to reservoir 258 after being sprayed in vessel 253 to capture heat from the compressed gas.

This process continues until vessel 253 is almost empty of liquid and filled at the same time with compressed gas, at which point the compressor 108 108 shuts off. Energy in the form of compressed gas is now available for use whenever needed from vessel 253. When demanded, the compressed gas flows out of vessel 253 through the heat exchanger 260 to the point of use. Alternatively the hot liquid in reservoir 258 can be sprayed directly into the compressed gas at the point of use as it is getting decompressed such that the expanding gas now extracts heat directly from the liquid.

Vessels 253 and 256 here can also be multiple vessels (as many as may be desired) arranged to perform the same functions. An example of multiple vessel system is presented in, but not limited to, the following descriptions:

Multiple Vessel System

The multiple vessel system can operate with as many pressure vessels as desired. The pressure vessels are not restricted to a linear arrangement as shown in the figures (which is only for simplicity) but can be in any configuration desired. A three vessel system 320 operation is described in FIG. 13, FIG. 14, FIG. 15, FIG. 16, FIG. 17, FIG. 18, FIG. 19 and FIG. 20.

Figure 13:
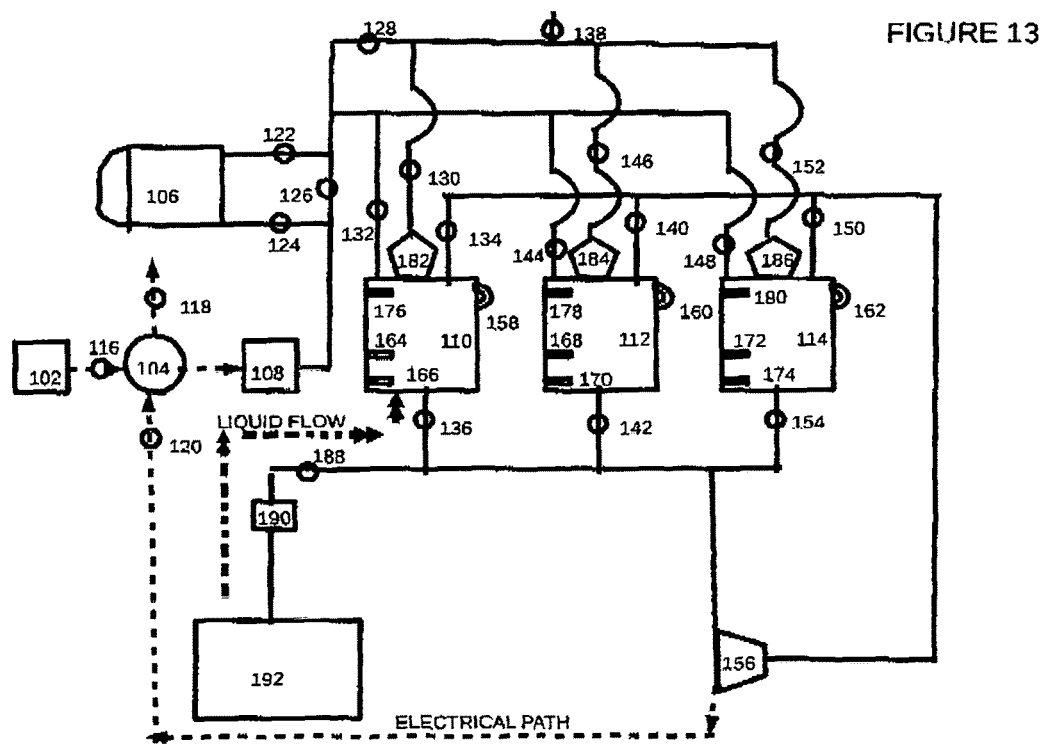
FIG. 13 depicts a first operating embodiment of the three vessel system 320 of this invention for energy storage system 100.

In the system operation for three vessel system 320 for the generation mode 330, switch 116 is closed to begin the operation. Electrical power flows through the integrating device 104 into the system so that valve 188 opens and liquid is pumped from reservoir 192 by the pump 190 into one of the three vessels, which is assumed for this description to be vessel 110 until upper limit (in this case on sensor 176) is reached. The gas supply device 108, which in the case of a compressor 108 generates compressed gas into the receiving vessel 106. Valves 122 and 126 are closed during this process. This is called the powering up stage 332 (FIG. 13). This stage ends when gas supply device cuts off (such as when a compressor 108 cuts off at the predetermined pressure) and initializing stage 334 commences.

As the three vessel system 320 cycle progress comes on, if it is determined that there is a shortage of liquid to fill up any of the three vessels 110, 112, and 114 to the upper limits (as determined by sensors 176, 178, and 180 respectively) when this is required during the operation, the three vessel system 320 will pause the system cycle and instruct pump 190 to fill up the particular vessel of any of the three vessels 110, 112 and 114; which need filling. Then the system cycle will resume where it left off.

Figure 14:
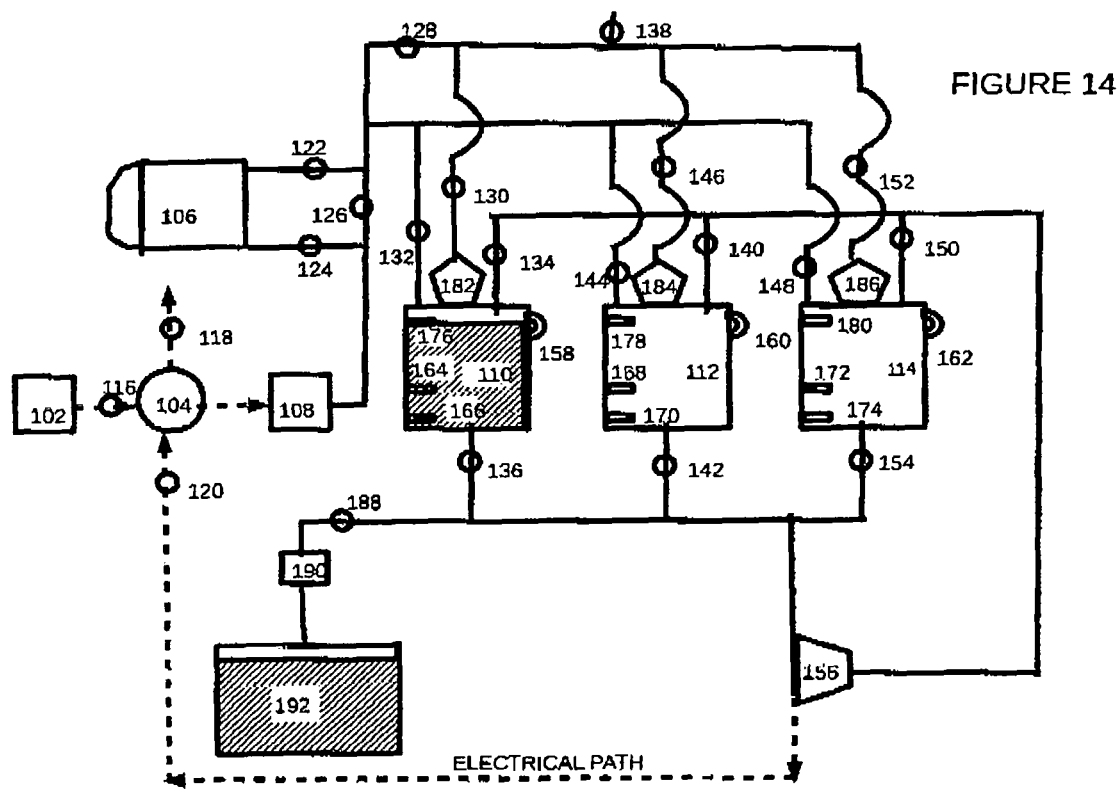
FIG. 14 depicts a second operating embodiment of the three vessel system 320 of this invention.

When the gas pressure in receiving vessel 106 reaches an upper predetermined pressure (for example compressor 108 cuts off) valve 122, valve 132, valve 136, valve 140 and valve 160 open while switch 120 closes. The pressurized gas from receiving vessel 106 forces the liquid from vessel 110 through the hydroturbine generator 156 into another vessel, for example, pressure vessel 112 for explanation purposes. The electrical energy generated by the hydroturbine generator 156 flows through switch 120 to the integrating device 104 and is looped back to power the gas supply device 108. This will reduce the power now being drawn from the external power source 102. This is called the initializing stage 334 (FIG. 14).

This process or initializing stage 334 continues until the liquid level in vessel 110 reaches a low limit determined by limit sensor 164 at which point valve 150 and venting device 162 opens, after which valve 140 and 160 closes while valve 140 and valve 144 opens. This has the effect of feeding the hydroturbine generator 156 from vessels 110 and 112 at the same time, while vessel 114 receives liquid coming from hydroturbine generator 156. Thus is first transition stage 336 (FIG. 15).

Figure 15:
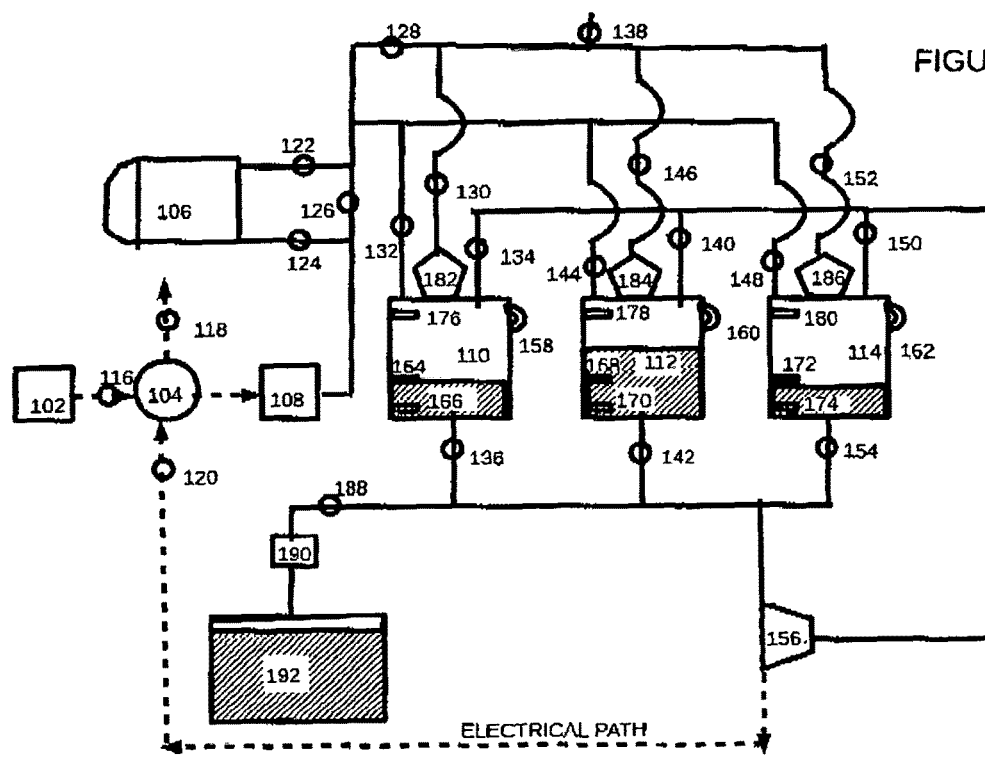
FIG. 15 depicts a third operating embodiment of the three vessel system 320 of this invention.
Figure 16:
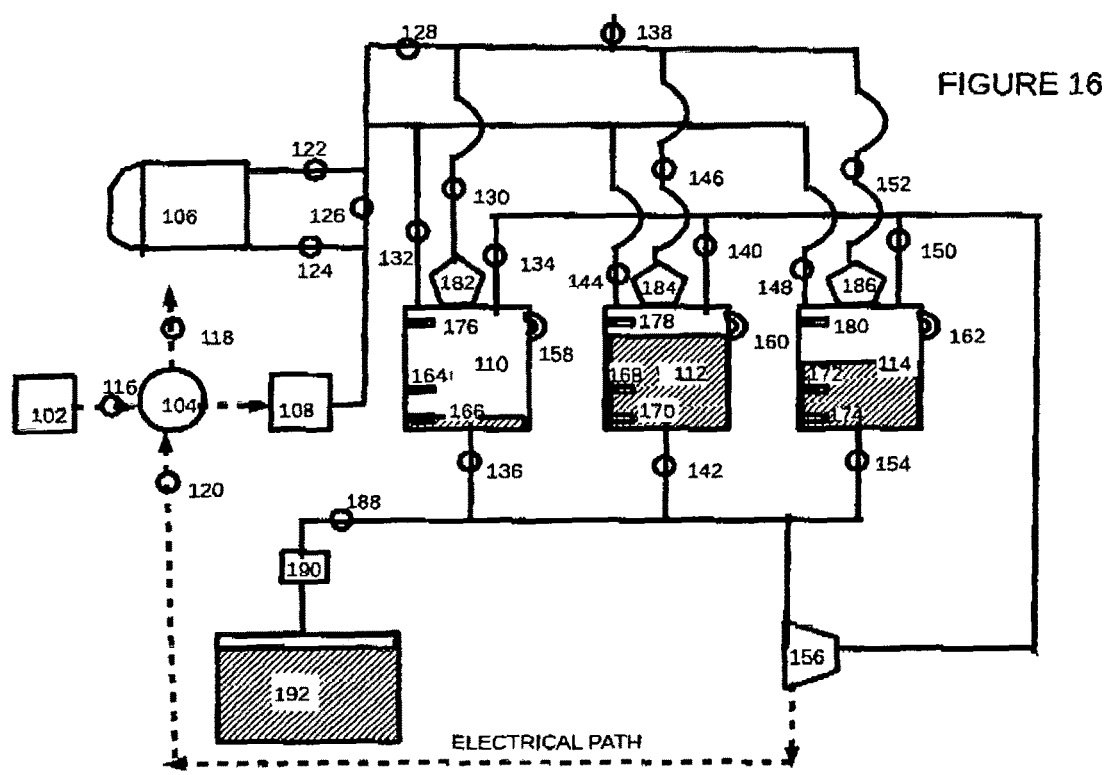
FIG. 16 depicts is a fourth operating embodiment of the three vessel system 320 of this invention.

FIG. 15 and FIG. 16 combine to explain and coordinate first transition stage 336 and second cycle stage 338 respectively. This first transition stage 336 of FIG. 15 continues until the liquid in vessel 110 reaches a lower limit determined by limit sensor 166 at which point, valve 132 and valve 136 closes. This has the effect of feeding hydroturbine generator 156 from vessel 112 alone while vessel 110 contains compressed gas. The gas in vessel 110 can be used to power any suitable equipment or to generate electrical power as needed. This is called the second cycle stage 338 (FIG. 16).

The compressed gas in vessel 110 for first transition stage 336 and second cycle stage 338 can be used in two ways:
i. Valve 130 and valve 138 open allowing compressed gas to move from vessel 110 to any external device that can be powered by it. Valve 138 stays open for the rest of the energy storage system 100 operation. This can be done while other processes in the system continues to run. This is the more common way this energy storage system 100 will be used and will be assumed in the description of the system operation.
ii. A second option is that all other processes in the energy storage system 100 is paused, wherein valve 126, valve 128 and valve 130 open, thereby allowing the compressed gas to flow through the reversible gas supply device 108 to generate electricity which is fed to an external load through the integrating device 104 and switch 118. It is also possible to bypass the integrating device 104 in this case by use of diodes and other electrical and electronic devices so that there is a separate path to the external load if this is so desired.

Figure 17:
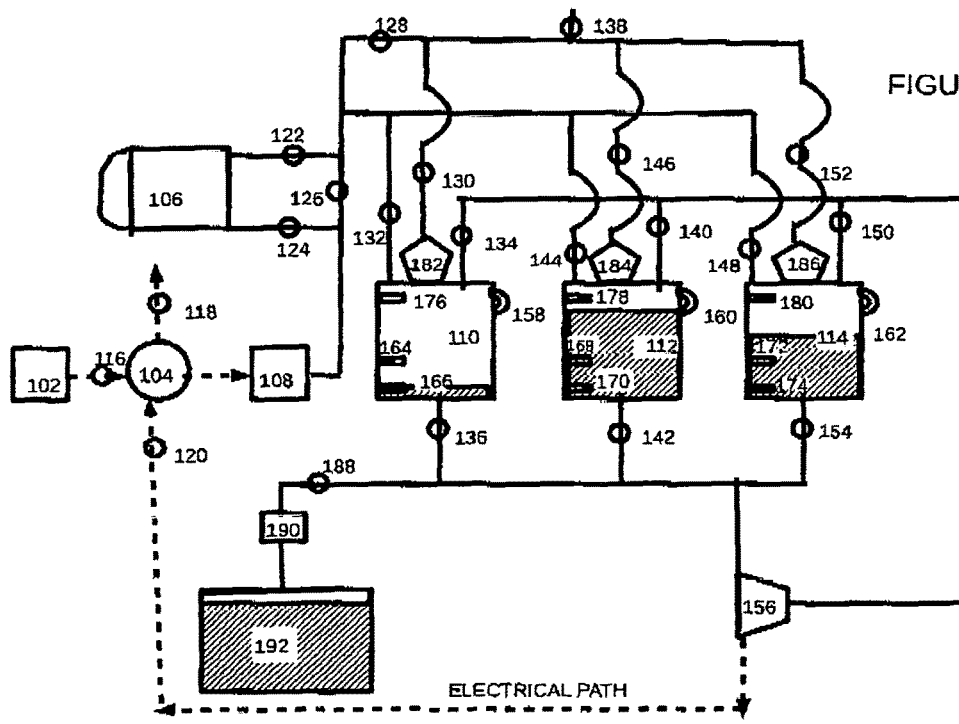
FIG. 17 depicts a fifth operating embodiment of the three vessel system 320 of this invention.

In FIG. 17, the process of feeding the hydroturbine generator 156 from vessel 112 continues until the low limit determined by limit sensor 168 is reached. If by this time the compressed gas in vessel 110 is being depleted, then valve 130 closes while valves 134 and 158 opens (if the compressed gas contained in any of the vessels 110, 112 and 114 at any time during the system operation are not used up, the system will pause other operations while allowing the remaining gas in any of the vessels to be consumed after which system operation picks up where it left off). After this valve 150 and venting device 162 closes while valve 148 and valve 154 opens. This effectively feeds hydroturbine generator 156 from vessels 112 and 114, while liquid returns from the hydroturbine generator 156 to vessel 110, this is called transition stage 2 or second transition stage 350.

Figure 18:
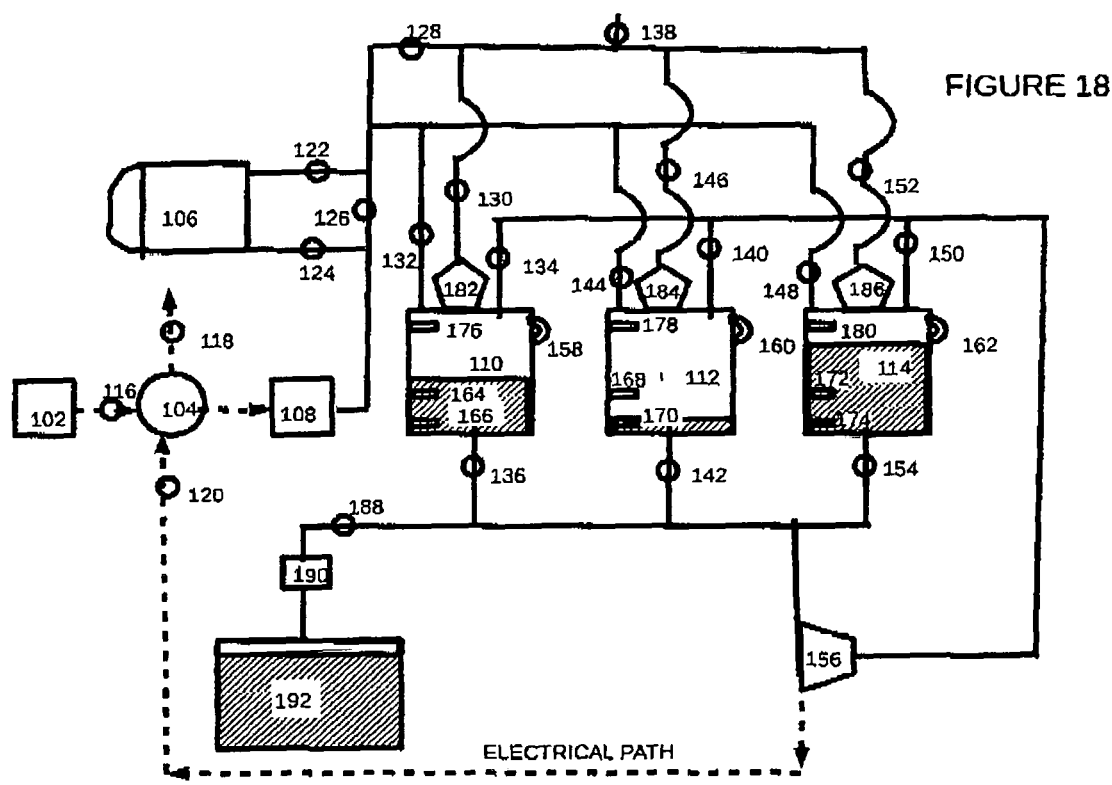
FIG. 18 depicts a sixth operating embodiment of the three vessel system 320 of this invention.

Referring now to FIG. 18, when lower limit 170 is reached in vessel 112, valve 140 and valve 142 closes so that hydroturbine generator 156 is now fed from vessel 114. Valve 146 opens to allow compressed gas in 112 to power any suitable external device or equipment, this is called third cycle stage 352.

Figure 19:
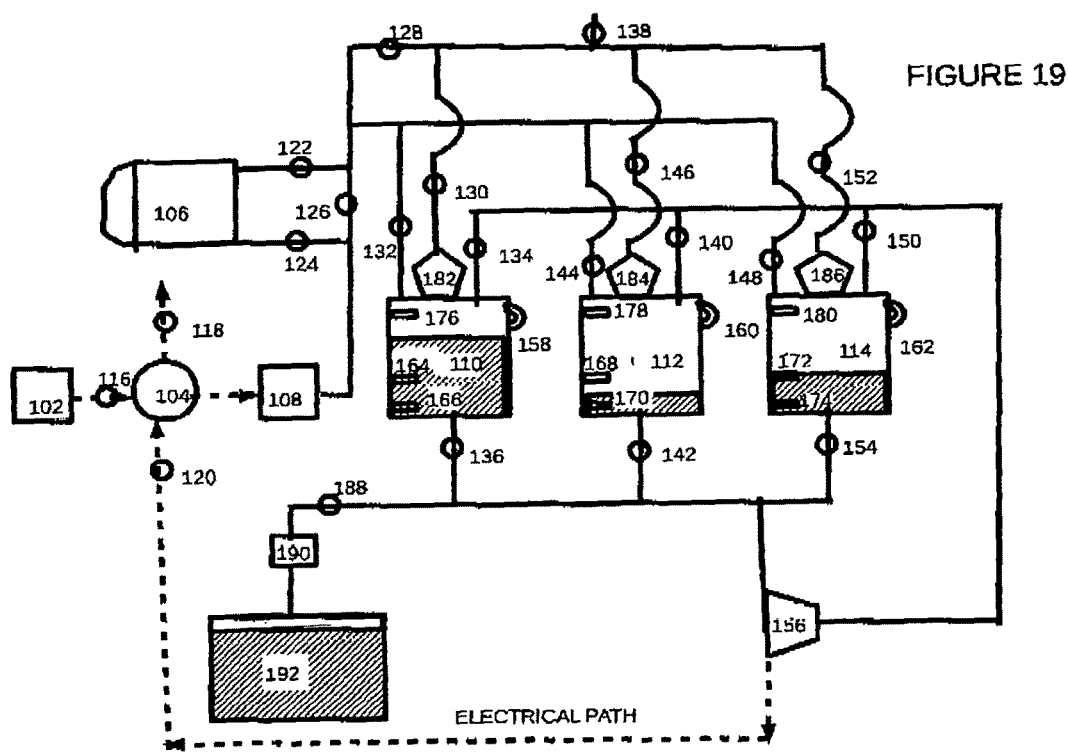
FIG. 19 depicts is a seventh operating embodiment of the three vessel system 320 of this invention.

Then turning to FIG. 19, this process continues until a limit determined by sensor 172 in vessel 114 is reached and if compressed gas in vessel 112 is depleted, then valve 140 and valve 160 open. After this valves 134 and 158 close while valve 132 and valve 136 open, effectively feeding hydroturbine generator 156 from vessels 110 and 114, while liquid returns from the hydroturbine generator 156 to vessel 112. This is called third transition stage 344.

In FIG. 19, when the lower limit determined by sensor 174 in vessel 114 is reached, valve 148 and valve 154 close. This set up implies that hydroturbine generator 156 is now being fed by vessel 110 alone.

Figure 20:
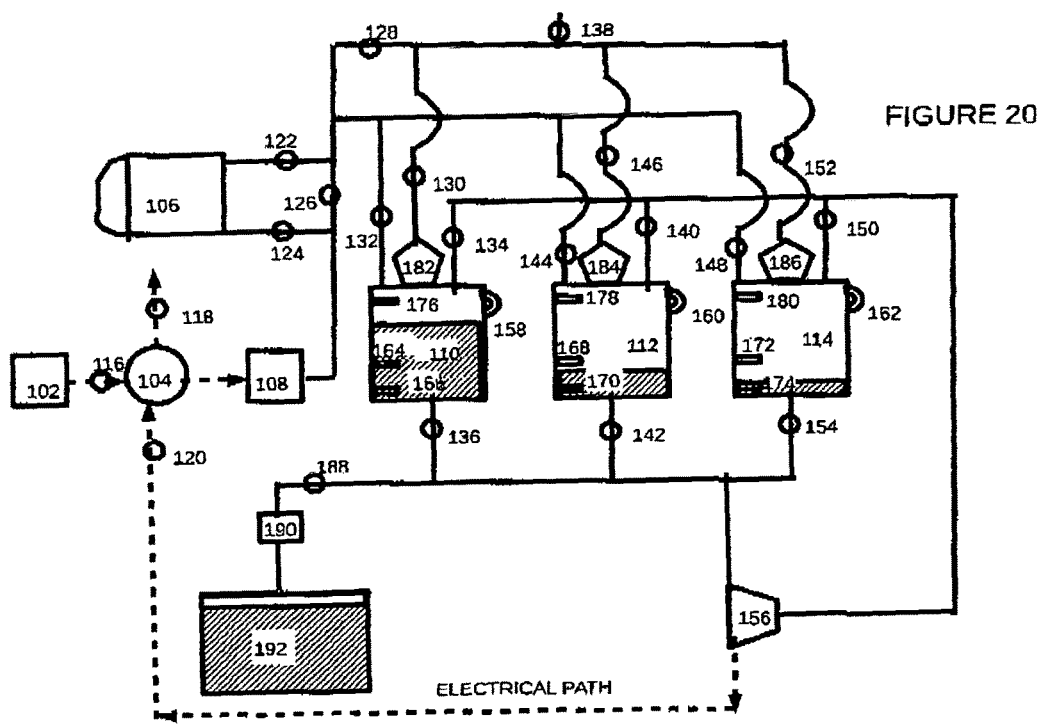
FIG. 20 depicts a eighth operating embodiment of the three vessel system 320 of this invention.

In this fashion, FIG. 20 depicts how energy storage system 100 thus comes back to how things were at the initializing stage of the operation cycle, except that liquid has now passed through all three vessels. Vessel 114 now contains compressed gas which is subsequently released to power any suitable devices or equipment when valve 152 opens. This stage is, therefore called first cycle stage 348 to differentiate it from the initializing stage 334.

The energy storage system 100 then goes through the first cycle stage 348, first transition stage 336, second cycle stage 338, second transition stage 350, third cycle stage 352, third transition stage 354 and back to first cycle stage 348 repeatedly as long as the compressed gas in the vessels 110, 112 and 114 is being used up. If the gas is not used up the energy storage system 100 will pause until the gas is used up, after which the cycle resumes.

The energy storage system 100 processes can be controlled by devices or systems which can be, but are not limited to a programmable controller, an EPROM, a host computer or computers comprising processor or processors in electronic communication (local or remote) with one or more computer-readable mediums, the computer storage mediums having stored thereon one or more codes to instruct the processor to receive signal from the various sensors in the system to monitor the various parameters of the system and to control one or more system elements in response to the parameters or in response to other instructions from the codes.

Energy Storage Mode

The energy storage system 100 can also operate on storage mode. In this case energy is stored for later use in the form of, but not limited to, compressed gas. When operated in this mode, the energy storage system 100 can hibernate until the compressed gases are used up after which the operating cycle resumes.

As an example of operation in storage mode, the system after powering on and initializing will go into first transition stage 336 and second cycle stage 338 as described in the generation mode except that valve 130 and valve 138 will remain closed. This will have the effect of keeping compressed gas in vessel 110 instead of releasing it for use. After this the system hibernates until the gas in vessel 110 is used up after which it resumes the rest of the cycle of operation.

The energy storage system 100 can also go into the storage mode at any part of the operating cycle. Valves 130, 138, 146 and 152 will all remain closed and compressed gas will be held in any of the vessels 110, 112 and 114 that may be containing them at the point in the cycle when storage mode is activated and the system goes into hibernation. To resume valve 138 opens. Then any of valves 130, 146 and 152 which are controlling the particular vessel with unreleased gas (evidenced by the fact that level of liquid in that particular vessel is at or below limit sensor 164 for vessel 110, limit sensor 168 for vessel 112, limit sensor 172 for vessel 114 will open and compressed gas contained therein will be used as desired and the system will pick up where it left off on the operating cycle.

Three Vessels Operation Sequence

At the start of the first cycle 330 (powering on) as shown in FIG. 13, this stage ends when gas supply device cuts off (typically such as when compressor 108 cuts off at the predetermined pressure) and the start of initializing second cycle stage 338 (FIG. 14) then commences.

Status of System Elements—at Start of First Cycle 330 (FIG. 3)

| | |
|---|---|
| electrical switch 116 | CLOSED |
| electrical switch 118 | OPEN |
| electrical switch 120 | OPEN |
| valve 122 | CLOSED |
| valve 124 | OPEN |
| valve 126 | CLOSED |
| valve 128 | CLOSED |
| valve 130 | CLOSED |
| valve 132 | CLOSED |
| valve 134 | CLOSED |
| valve 136 | OPEN |
| valve 138 | CLOSED |
| valve 140 | CLOSED |
| valve 140 | CLOSED |
| valve 144 | CLOSED |
| valve 146 | CLOSED |
| valve 148 | CLOSED |
| valve 150 | CLOSED |
| valve 152 | CLOSED |
| valve 154 | CLOSED |
| hydroturbine generator 156 | NOT GENERATING POWER |
| venting device 158 | OPEN |
| venting device 160 | CLOSED |
| venting device 162 | CLOSED |
| valve 188 | OPEN |

Start of Cycle 2 or Second Cycle Stage 338-Initializing (FIG. 14)

This stage ends when low point as indicated by limit sensor 164 is reached on vessel 110. First transition stage 336 then starts.

Status of System Elements at/start of Second Cycle Stage 338

| | |
|---|---|
| electrical switch 116 | CLOSED |
| electrical switch 118 | OPEN |
| electrical switch 120 | CLOSED |
| valve 122 | OPEN |
| valve 124 | OPEN |
| valve 126 | CLOSED |
| valve 128 | CLOSED |
| valve 130 | CLOSED |
| valve 132 | OPEN |
| valve 134 | CLOSED |
| valve 136 | OPEN |
| valve 138 | CLOSED |
| valve 140 | OPEN |
| valve 140 | CLOSED |
| valve 144 | CLOSED |
| valve 146 | CLOSED |
| valve 148 | CLOSED |
| valve 150 | CLOSED |
| valve 152 | CLOSED |
| valve 154 | CLOSED |
| hydroturbine generator 156 | GENERATING POWER |
| venting device 158 | CLOSED |
| venting device 160 | OPEN |
| venting device 162 | CLOSED |
| valve 188 | CLOSED |

First Transition Stage FIG. 15

This stage ends when lower point 166 is reached in vessel 110. Second Cycle stage 338 then starts.

Status of System Elements During First Transition Stage 336 FIG. 15

| | |
|---|---|
| electrical switch 116 | CLOSED |
| electrical switch 118 | OPEN |
| electrical switch 120 | CLOSED |
| valve 122 | OPEN |
| valve 124 | OPEN |
| valve 126 | CLOSED |
| valve 128 | CLOSED |
| valve 130 | CLOSED |
| valve 132 | OPEN |
| valve 134 | CLOSED |
| valve 136 | OPEN |
| valve 138 | OPEN |
| valve 140 | CLOSED |
| valve 140 | OPEN |
| valve 144 | OPEN |
| valve 146 | CLOSED |
| valve 148 | CLOSED |
| valve 150 | OPEN |
| valve 152 | CLOSED |
| valve 154 | CLOSED |
| Hydroturbine 156 | GENERATING POWER |
| venting device 158 | CLOSED |
| valve 160 | CLOSED |
| venting device 162 | OPEN |
| valve 188 | CLOSED |

Cycle Stage 2 or Second Cycle Stage 338

This stage ends when low point 168 is reached in vessel 112. Transition stage 2 or second transition stage 350 then starts.

Status of System Elements During Cycle Stage 2 or Second Cycle Stage 338

| | |
|---|---|
| electrical switch 116 | CLOSED |
| electrical switch 118 | OPEN |
| electrical switch 120 | CLOSED |
| valve 122 | OPEN |
| valve 124 | OPEN |
| valve 126 | CLOSED |
| valve 128 | CLOSED |
| valve 130 | OPEN |
| valve 132 | CLOSED |
| valve 134 | CLOSED |
| valve 136 | CLOSED |
| valve 138 | OPEN |
| valve 140 | CLOSED |
| valve 140 | OPEN |
| valve 144 | OPEN |
| valve 146 | CLOSED |
| valve 148 | CLOSED |
| valve 150 | OPEN |
| valve 152 | CLOSED |
| valve 154 | CLOSED |
| hydroturbine generator 156 | GENERATING POWER |
| venting device 158 | CLOSED |
| venting device 160 | CLOSED |
| venting device 162 | OPEN |
| valve 188 | CLOSED |

Transition Stage 2 or Second Transition Stage 350

This stage ends when lower point 170 is reached in vessel 112. Cycle stage 3 or third cycle stage 352 then starts.

Status of System Elements During Transition Stage 2 or Second Transition Stage 350

| | |
|---|---|
| electrical switch 116 | CLOSED |
| electrical switch 118 | OPEN |
| electrical switch 120 | CLOSED |
| valve 122 | OPEN |
| valve 124 | OPEN |
| valve 126 | CLOSED |
| valve 128 | CLOSED |
| valve 130 | CLOSED |
| valve 132 | CLOSED |
| valve 134 | OPEN |
| valve 136 | CLOSED |
| valve 138 | OPEN |
| valve 140 | CLOSED |
| valve 140 | OPEN |
| valve 144 | OPEN |
| valve 146 | CLOSED |
| valve 148 | OPEN |
| valve 150 | CLOSED |
| valve 152 | CLOSED |
| valve 154 | OPEN |
| hydroturbine generator 156 | GENERATING POWER |
| venting device 158 | OPEN |
| venting device 160 | CLOSED |
| venting device 162 | CLOSED |
| valve 188 | CLOSED |

Cycle Stage 3 or Third Cycle Stage 352

This stage ends when low point 172 is reached in vessel 114. Transition stage 3 then starts.

Status of System Elements During Cycle Stage 3 or Third Cycle Stage 352

| | |
|---|---|
| electrical switch 116 | CLOSED |
| electrical switch 118 | OPEN |
| electrical switch 120 | CLOSED |
| valve 122 | OPEN |
| valve 124 | OPEN |
| valve 126 | CLOSED |
| valve 128 | CLOSED |
| valve 130 | CLOSED |
| valve 132 | CLOSED |
| valve 134 | OPEN |
| valve 136 | CLOSED |
| valve 138 | OPEN |
| valve 140 | CLOSED |
| valve 140 | CLOSED |
| valve 144 | CLOSED |
| valve 146 | OPEN |
| valve 148 | OPEN |
| valve 150 | CLOSED |
| valve 152 | CLOSED |
| valve 154 | OPEN |
| hydroturbine generator 156 | GENERATING POWER |
| venting device 158 | OPEN |
| venting device 160 | CLOSED |
| venting device 162 | CLOSED |
| valve 188 | CLOSED |

Third Transition Stage 344

This stage ends when lower point 174 is reached on vessel 114. Cycle stage 1 or first cycle stage 348 or first cycle stage 348 then starts.

Status of System Elements/during Third Transition Stage 344

| | |
|---|---|
| electrical switch 116 | CLOSED |
| electrical switch 118 | OPEN |
| electrical switch 120 | CLOSED |
| valve 122 | OPEN |
| valve 124 | OPEN |
| valve 126 | CLOSED |
| valve 128 | CLOSED |
| valve 130 | CLOSED |
| valve 132 | OPEN |
| valve 134 | CLOSED |
| valve 136 | OPEN |
| valve 138 | OPEN |
| valve 140 | OPEN |
| valve 140 | CLOSED |
| valve 144 | CLOSED |
| valve 146 | CLOSED |
| valve 148 | OPEN |
| valve 150 | CLOSED |
| valve 152 | CLOSED |
| valve 154 | OPEN |
| hydroturbine generator 156 | GENERATING POWER |
| venting device 158 | CLOSED |
| venting device 160 | OPEN |
| venting device 162 | CLOSED |
| valve 188 | CLOSED |

Cycle Stage 1 or First Cycle Stage 348

First cycle stage 348 ends when low point as indicated by limit sensor 164 is reached in vessel 110. The system then reverts to transition stage 1 or first transition stage 336. This completes the system cycle as the system will now run repeatedly through the following stages; cycle stage 1 or first cycle stage 348 or first cycle stage 348, transition stage 1 or first transition stage 336, cycle stage 2 or second cycle stage 338, transition stage 2 or second transition stage 350, cycle stage 3 or third cycle stage 352 and transition stage 3. This situation will continue unless the system is stopped or instructed to revert to another program.

Status of System Elements During Cycle Stage 1 or First Cycle Stage 348

| | |
|---|---|
| electrical switch 116 | CLOSED |
| electrical switch 118 | OPEN |
| electrical switch 120 | CLOSED |
| valve 122 | OPEN |
| valve 124 | OPEN |
| valve 126 | CLOSED |
| valve 128 | CLOSED |
| valve 130 | CLOSED |
| valve 132 | OPEN |
| valve 134 | CLOSED |
| valve 136 | OPEN |
| valve 138 | OPEN |
| valve 140 | OPEN |
| valve 140 | CLOSED |
| valve 144 | CLOSED |
| valve 146 | CLOSED |
| valve 148 | CLOSED |
| valve 150 | CLOSED |
| valve 152 | OPEN |
| valve 154 | CLOSED |
| hydroturbine generator 156 | GENERATING POWER |
| venting device 158 | CLOSED |
| venting device 160 | OPEN |
| venting device 162 | CLOSED |
| valve 188 | CLOSED |

FIVE VESSEL OPERATION EXAMPLE

Figure 21A:
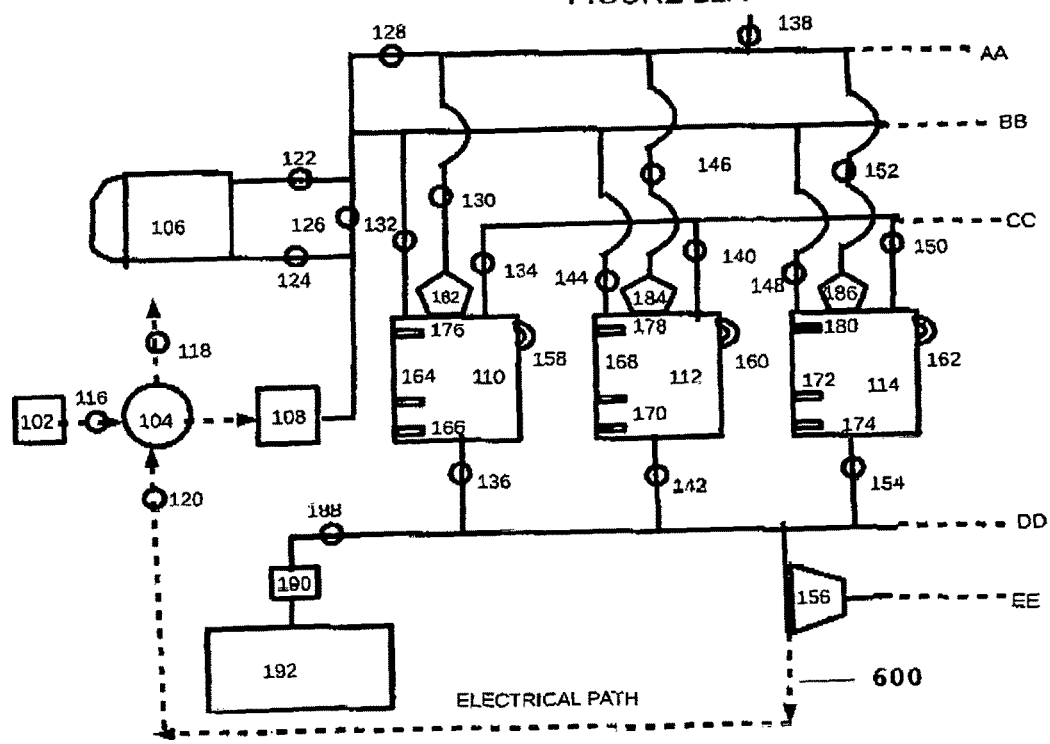
FIG. 21 depicts a five vessel system 600 of the invention in closed position 602 for energy storage system 100.
Figure 21B:
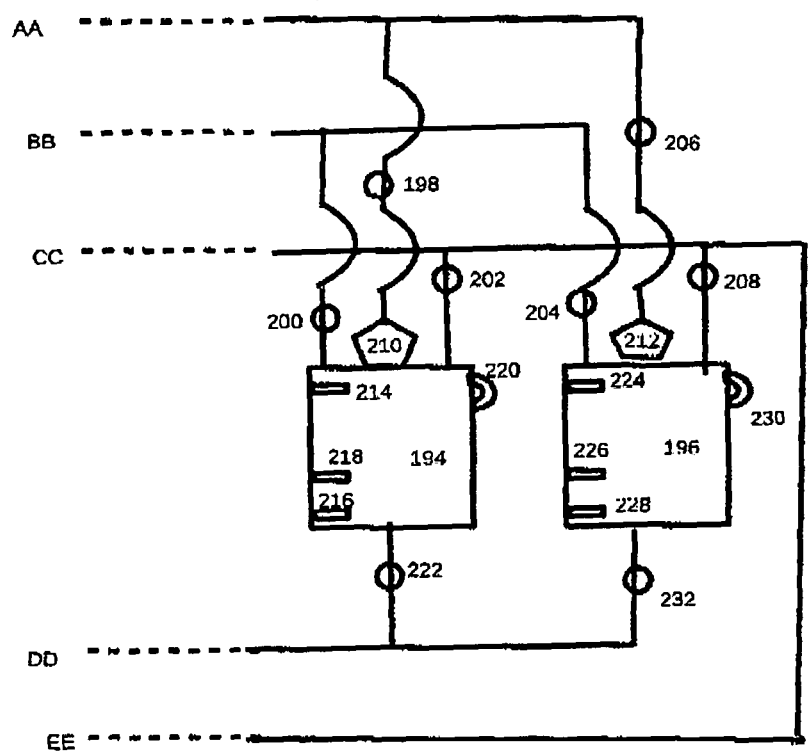

FIG. 21 depicts a five vessel closed system 600 of the invention. FIG. 21 is split into FIG. 21A and FIG. 21B. Line AA of FIG. 21A connects with Line AA of FIG. 21B. Line BB of FIG. 21A connects with Line BB of FIG. 21B. Line CC of FIG. 21A connects with Line of CC of FIG. 21B. Line DD of FIG. 21A connects with Line DD of FIG. 21B. Line EE of FIG. 21A connects with Line EE of FIG. 21B. In this manner FIG. 21 may be shown as complete and proper size by being shown on two pages.

An example of a five vessel system is presented but not limited to the following descriptions in FIG. 21 and the tables. When the system is turned on it will go through the powering up, initializing, transition stage 1 or first transition stage 336, cycle stage 2 or second cycle stage 338, transition stage 2, cycle stage 3, transition stage 3, cycle stage 4, transition stage 4 or fourth transition stage 356, cycle stage 5, transition stage 5, cycle stage 1 and transition stage 1 or first transition stage 336 respectively. After this the system will settle down to cycling repeatedly through the following series: transition stage 1 or first transition stage 336, transition stage 2, cycle stage 3, transition stage 3, cycle stage 4, transition stage 4 or fourth transition stage 356, cycle stage 5, transition stage 5, cycle stage 1 and back to transition stage 1 or first transition stage 336.

Figure 23:
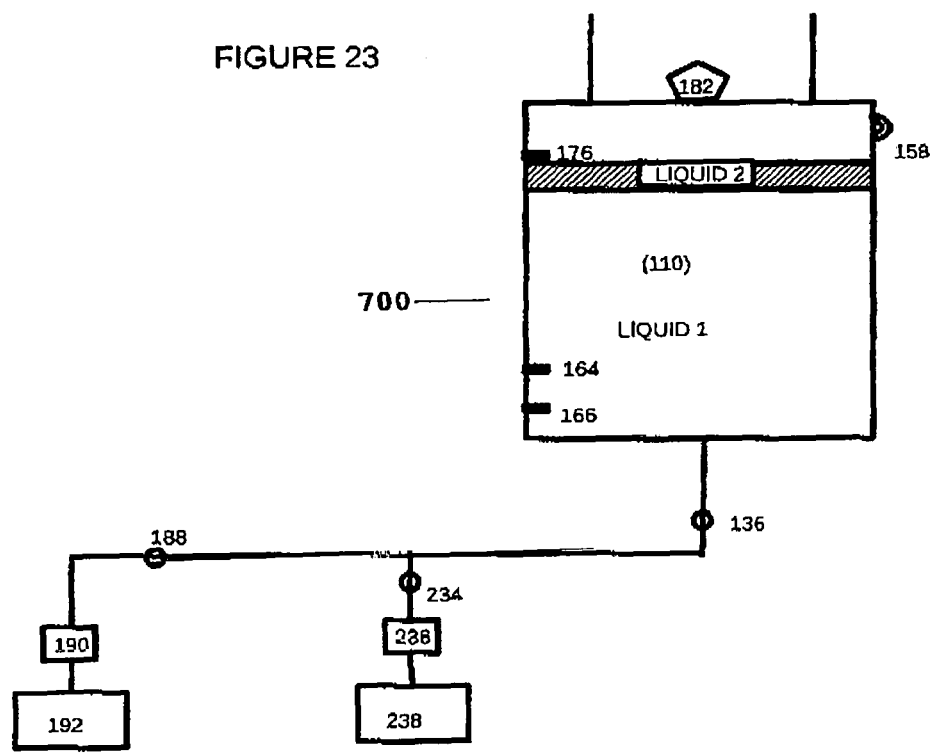
FIG. 23 depicts a multi-liquid system 700 for energy storage system 100 in operation.

FIG. 23 depicts a multi-liquid system 700 in operation. It is focused on one of the vessels (vessel 110) in the system and also highlighted the use of addition pump 236, valve 234 and reservoir 238 to inject the second fluid into the system. Additional pumps, valves and reservoirs can be added as may be desired depending on how many liquids are used.

FIG. 24 depicts how the invention will work when the gas supply device 108 is electrolytic. FIG. 24 is split into FIG. 24 A, FIG. 24 B and FIG. 24 B. Line FF of FIG. 24 A connects with Line FF of FIG. 24 C. Line KK of FIG. 24 B connects with Line KK of FIG. 24 C. In this manner FIG. 29 may be shown as complete and proper size by being shown on three pages.

Some Other Embodiments of the Invention

There are other instances when the system must be configured to adapt to various situations such as when the gas supply device may be some other devices other than a compressor 108 or when dealing with high pressures. Below are some of such embodiments like the cryogenic, electrolytic, multifluid and open systems.

Cryogenic Systems

Figure 25:
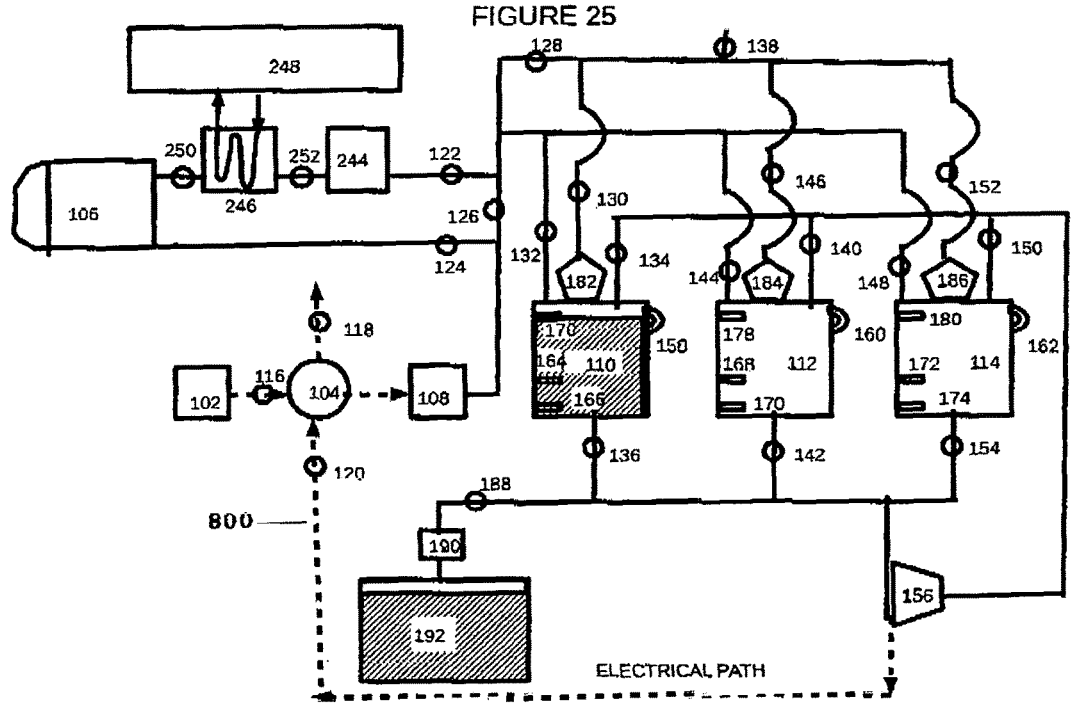
FIG. 25 depicts a three vessel cryogenic system 800 for energy storage system 100, where the gas supply device 108 is a cryogenic cooling system to produce liquified (or in some cases solidified) gases.

FIG. 25 shows a three vessel cryogenic system. In this case the gas supply device 108 is a cryogenic cooling system to produce liquified (or in some cases solidified) gases. In the case of the cryogenic cooling system, the gas receiver is simply replaced by an apparatus that will store liquefied or solidified gases as well as the means to convert them back to gas under pressure. An example of such an apparatus is shown in FIG. 25, in this case the cryogenic liquid or solid produced by the cryogenic cooling system 108 is stored inside a cryogenic container 246.

Valve 250 opens to allow the cryogenic fluids to pass and closes after container 246 is being filled to the desired capacity. In the case of a solidified gas, there will be the need to have a means of propelling the cryogenic materials into the container 246. Such means can be but are not limited to a set of screw conveyors installed in the pipeline.

When compressed gas in FIG. 25 is needed the cryogenic fluid absorbs the necessary heat of vaporization from the heat reservoir 248 through the heat exchanging coils 322 in container 246. Another alternative will be to wrap the heat exchanging coils 322 the container 246. pump 266 drives the medium used inside the heat exchanging coils 322. Such mediums can be liquid or gas depending on the nature of the heat reservoir 248.

Electrolytic Systems

In the case of the electrolytic system (FIG. 24), gas is produced by the passage of electricity through a suitable electrolyte in the gas supply device 108. The gas is then kept under pressure in a suitable receiving vessel 106 and used as had been previously described. The only difference is that electrolytic processes can produce more than one gaseous product. Each gas is used separately to power its own system as shown in FIG. 24. The figure is showing the case when there are two gaseous products from the electrolytic process but equally applies when there are more.

An interesting aspect of this embodiment is that power can be recovered back from the gases released in the system in more than one way. Firstly power can be tapped from the pressure of the gases through the pressure equipment 240 which are designed to use gas pressure to operate. The pressure equipment can give out electricity as the output as shown in the figure or some other type of output such as mechanical work or any other desired output can be obtained.

Secondly power can be obtained from the chemical energy of the gases through the chemical equipment 242 which is designed to give out electricity or any other desired output from the chemical energy and processes of the gaseous output from the system, for example recombining the gases as in a fuel cell or any other desired way of utilizing the chemical energy of the gases. Sometimes the gases themselves might be the desired end product to be shipped or distributed to customers, in which case they are then stored in appropriate containers. It may be noted that the outputs (electricity, mechanical work e.t.c) from the multiple gas systems are shown as separate in FIG. 24 below but in practice they can also be combined to form one single output.

Multiple Liquids or Diaphragms

The system can also use multiple liquids (multi-fluid) where two or more different liquids are used in the pressure vessels. A system with two working liquids is shown in FIG. 23. Here, focus is on one of the vessels in a three or five vessel system (vessel 110) to explain how this works. Liquid 2 can serve as a buffer or barrier or seal for liquid 1 in cases where liquid 1 will be affected by the gas used for example high pressure applications or possibility of chemical reactions. In this case liquid 2 will be more resistant to the conditions of the gases. Valve 224 controls the flow of liquid 2 which is pumped by pump 236 from the liquid reservoir 238. The system 100 operates in much the same way as had been described before for a three or five vessel system with the exception that multiple liquids are used. It is also possible to use other means including but not limited to diaphragms or other types of barriers to separate the gas from the liquids.

Open System

Figure 22A:
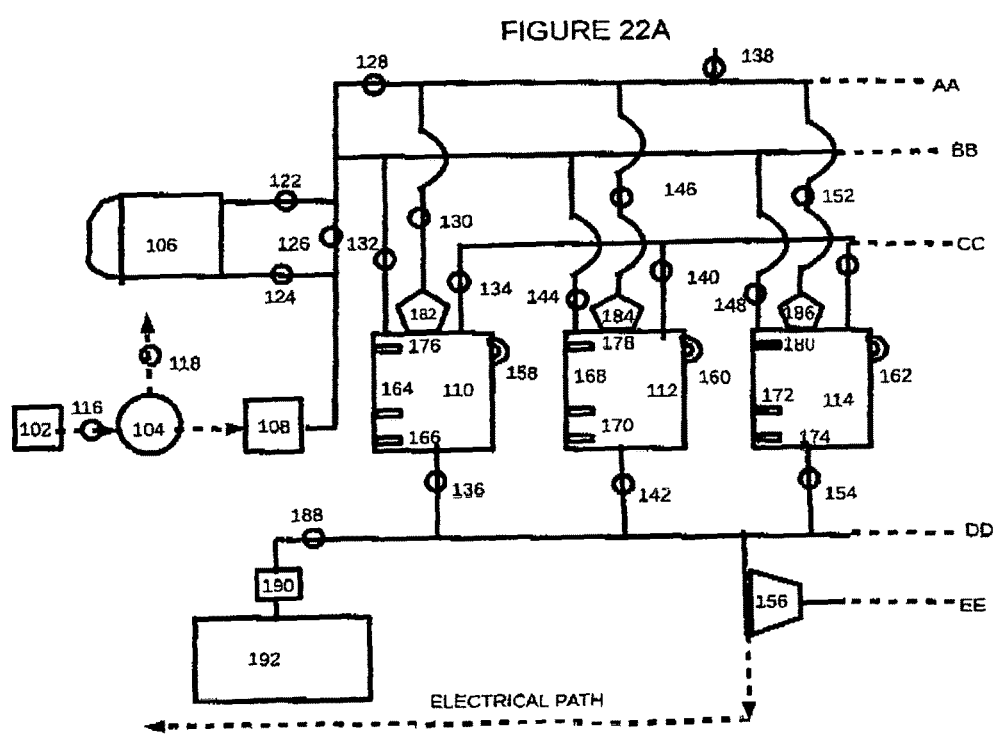
FIG. 22 depicts a five vessel system 600 of the invention in open position 604.
Figure 22B:
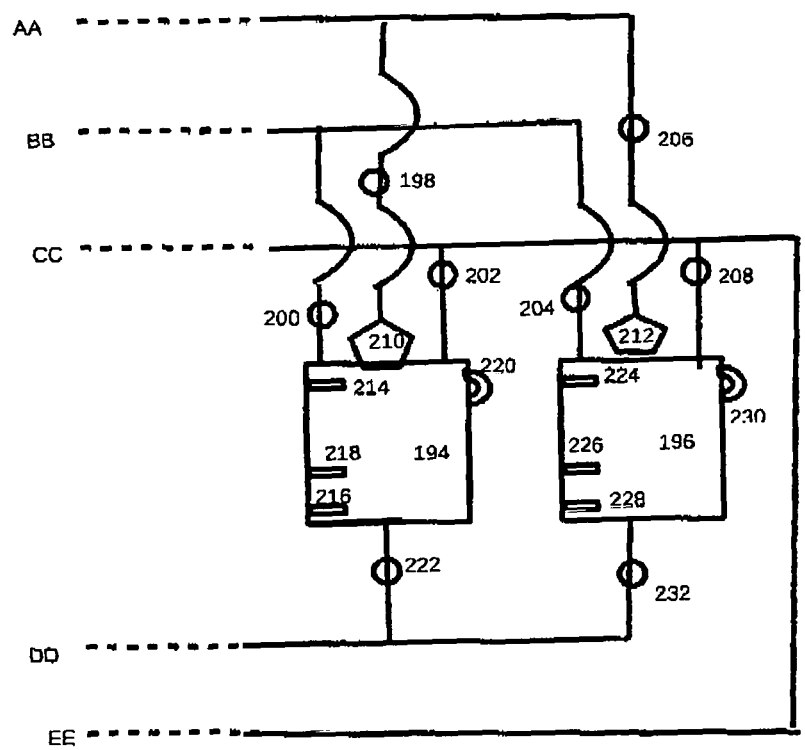

What is most unique to this invention and sets it apart from other prior art is what is referred to as an energy loop whereby the output from the hydroturbine generator 156 is fed back to the gas generating devices to boost system efficiency. However, the system can also be open in which case the output from the hydroturbine is used in some other way and the system is sustained by the external electrical power source and still releases compressed air at the intervals described in the operating cycle for use. This is shown in FIG. 22.

Figure 26:
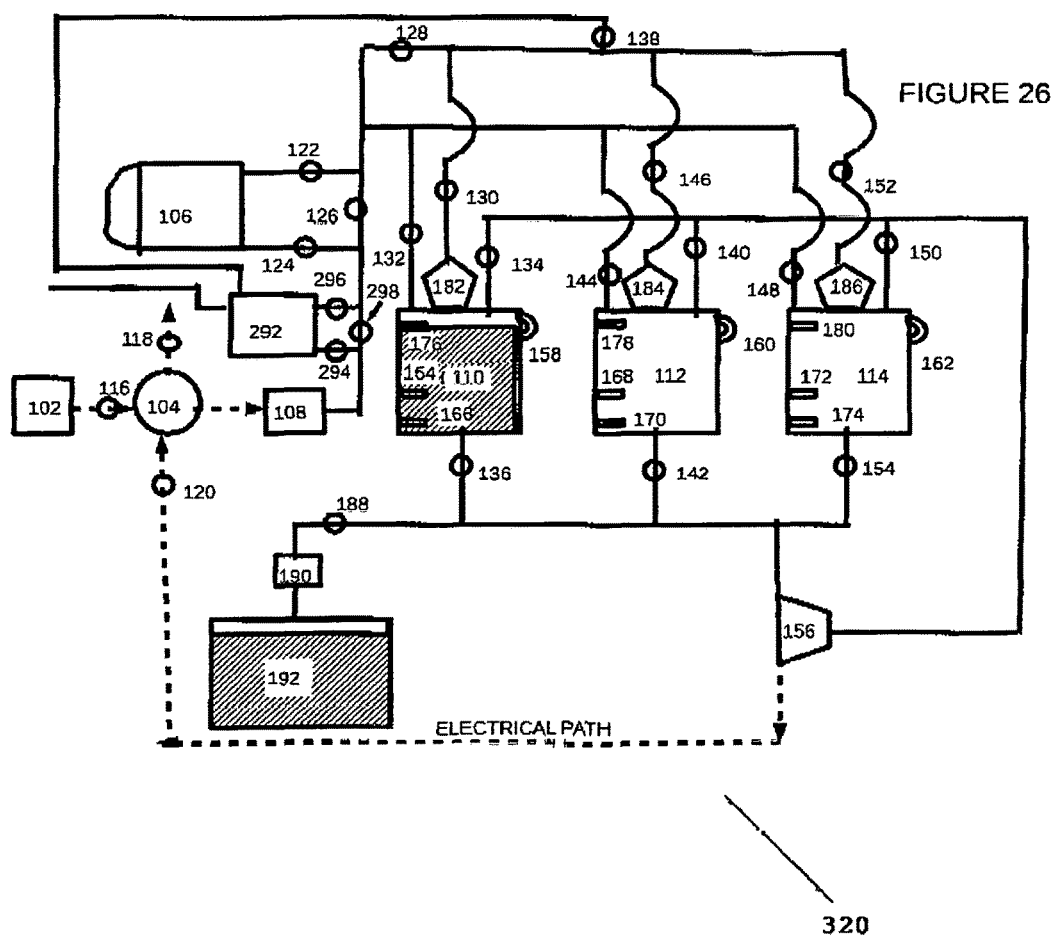
FIG. 26 shows the three vessel system 320 with a heat capture function.

FIG. 26 shows the three vessel system 320 with a heat capture function. The heat capture function is accomplished by having vessel 292 filled with a heat absorbing medium (such as liquid water or any other suitable medium) and containing heat exchanging coils 322 to facilitate heat transfer. Alternately, the compressed gas may be bubbled through the medium. The heat thus captured can be transferred back to the gas released through valve 138 before it is used up.

In the following examples, which are intended to illustrate without unduly limiting the scope of this invention, all parts and percentages are by unless otherwise indicated.

Example 1

In FIG. 1, FIG. 2, FIG. 3, FIG. 4, FIG. 5, FIG. 6, and FIG. 7, which demonstrate the prior art, water storage system 900 uses reversible turbine 902 to pump water 904 from lower container 906 to upper container 908. When desired, water 904 is released from upper container 908 to pass through reversible turbine 902, thereby generating electricity. Pumping from lower container 906 to upper container 908 occurs when there is low demand for electricity. With the water 904 in upper container 908, it may be released to pass through turbine 902 and generate electricity during periods of high demand. There are more units of electricity required to pump water 904 from lower container 906 to upper container 908 than are produced when water flows from upper container 908 through reversible turbine 902 into lower container 906. The only advantage is that electricity is available during periods of high demand.

Example 2

A three vessel system 320 operation is described in FIG. 13, FIG. 14, FIG. 15, FIG. 16, FIG. 17, FIG. 18, FIG. 19 and FIG. 20.

In the system operation for three vessel system 320 of FIG. 20 and FIG. 26 for the generation mode 330, switch 116 is closed to begin the operation. Electrical power flows through the integrating device 104 into the system so that valve 188 opens and liquid is pumped from reservoir 192 by the pump 190 into one of the three vessels, which is assumed for this description to be vessel 110 until upper limit (in this case on sensor 176) is reached. The gas supply device is compressor 108, which in the case of compressor 108 generates compressed gas into the receiving vessel 106. Valves 122 and 126 are closed during this process. This is called the powering up stage 332 (FIG. 13). This stage ends when gas supply device or cuts off (such as when a compressor 108 cuts off at the predetermined pressure) and the start of cycle 2 or second cycle stage 338—initializing stage 334 then commences. In this manner, electricity can be produced or stored as desired.

As the three vessel system 320 cycle progress comes on, if it is determined that there is a shortage of liquid to fill up any of the three vessels 110, 112, and 114 to the upper limits (as determined by sensors 176, 178, and 180 respectively) when this is required during the operation, the three vessel system 320 will pause the system cycle and instruct pump 190 to fill up the particular vessel of any of the three vessels 110, 112 and 114; which need filling. Then the system cycle will resume where it left off.

While the foregoing describes some ways the invention can be used on its own or in combination with some other systems, it may be pointed out that there will be the existence of variations, combinations and equivalents of the specific embodiments, methods, and examples herein or combinations with some other energy storage systems. The invention may, therefore, not be limited by the above described embodiments, methods and examples, but by all embodiments and methods within the scope and spirit of the invention.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. An energy storage and generation system for storing or producing electricity comprising:

an energy storage mode and an energy generation mode;

wherein in the energy storage mode the system uses electrical power to produce and store energy in the form of a compressed gas;

wherein in the energy generation mode the system uses the compressed gas to produce electrical power;

at least one external electrical power source to provide the electrical power for the system when the system is operating in the energy storage mode or when the system is in transition from the energy storage mode to the energy generation mode and wherein the at least one external electrical power source is also able to receive electrical power back from the energy storage and generation system when the energy storage and generation system is operating in the energy generation mode;

at least one compressed gas producing device capable of taking in the electrical power to produce the compressed gas;

at least two liquid vessels for holding or releasing a liquid during system operation;

at least one reservoir for storing extra volumes of the liquid;

at least one hydroturbine generator connected through a network of pipelines to the at least two liquid vessels and the at least one reservoir;

an electrical integrating device controlled by a monitoring and control system and also connected electrically with the at least one external electrical power source, the at least one hydroturbine generator, the at least one compressed gas producing device and at least one electrical supply outlet; and at least one compressed gas vessel for storing the compressed gas and connected through the network of pipelines to the at least one compressed gas producing device and the at least two liquid vessels, wherein the energy storage and generation system, through the monitoring and control system is selectively switchable between the energy storage mode and the energy generation mode;

at least one liquid pump controlled electrically by the monitoring and control system and connected by the network of pipelines to the reservoir and the at least two liquid vessels; at least one liquid level sensor connected electrically to send an input to the monitoring and control system to sense the level of the liquid in the at least two liquid vessels;

at least one gas pressure sensor connected electrically to send an input to the monitoring and control system to sense the pressure of compressed gas inside the at least two liquid vessels and the at least one compressed gas vessel;

at least one liquid valve to control the flow of the liquid in the network of pipelines, wherein the at least one liquid valve is controlled electrically by the monitoring and control system;

at least one gas valve to control the flow of the gas in the network of pipelines, wherein the at least one gas valve is controlled electrically by the monitoring and control system;

at least one venting device to vent gas from the at least two liquid vessels, wherein the at least one venting device is controlled electrically by the monitoring and control system;

at least one compressed gas outlet connection along the network of pipelines connecting the at least one compressed gas vessel and the at least two liquid vessels, wherein the compressed gas outlet is able to allow the compressed gas to be passed from the energy storage and generation system to an external device;

at least one electrical connection switch controlled by the monitoring and control system to direct the flow of electrical power in the system;

wherein, when the system is operating in the energy storage mode at a first time, the liquid pump is energized by electrical power coming from the external electrical power source through the monitoring and control system and a portion of the liquid is transferred from the reservoir to at least one of the at least two liquid until an operational level is reached, the operational level being determined by the input sent from the at least one liquid sensor to the monitoring and control system;

wherein the compressed gas is generated by electrical power flowing from the external electrical source through the integrating device to the compressed gas generating device until the pressure of the gas in the at least one compressed gas vessel reaches an operational value determined by the input sent from the at least one gas pressure sensor to the monitoring and control system;

the energy storage and generation system then going into normal operation in the storage mode with the compressed gas being sent through the network of pipeline connection to the at least one liquid vessel that contains the liquid, the compressed gas pushing and replacing the liquid in the at least one liquid vessel containing liquid and sending the liquid through the at least one hydroturbine generator into a second empty liquid vessel of the at least two liquid vessel, a portion of the electrical power generated by the at least one hydroturbine generator is fed back through the integrating device to be combined with the electrical power coming from the external electrical power source and the combined electrical power being then used to continue powering the compressed gas generating device; and an energy producing capability is stored in the form of the compressed gas which replaces the liquid in the at least one liquid vessel containing liquid.

2. The energy storage and generation system of claim 1 further comprising:
the compressed gas producing device being a reversible device capable of receiving electrical power fed from the at least one external electrical source through the integrating device to produce compressed gas or working in reverse mode to receive the compressed gas stored in the at least one compressed gas vessel or the at least one liquid vessel whose liquid was replaced with the compressed gas and the compressed gas flowing through the connecting network of pipelines back to the reversible compressed gas producing device, wherein the reversible compressed gas producing device now produces electrical power that is fed back to the integrating device, the electrical power being released through the at least one electrical supply outlet to supply power to an external electrical load, or the electrical power being released back to assist the at least one external electrical source at a time when demand for electricity on the at least one external electrical source is high, and wherein the system is in the energy generation mode when the compressed gas producing device is operating in reverse mode.

3. The energy storage and generation system of claim 1 further comprising
the compressed gas generating device being an electrolytic device taking in electricity through the integrating device and converting an electrolyte into at least one type of compressed gas by electrolysis.

4. The energy storage and generation system of claim 1 further comprising:
multiple liquids used separately or together in the system with each liquid having a liquid reservoir connected through the network of pipelines to a respective liquid pump; and
the network of pipelines connecting each respective liquid pump to the at least two liquid vessels.

5. The energy storage and generation system of claim 4 further comprising, the electrical integrating device is a set of diodes, at least one transistor, at least one switch, or an electronic device.

6. The energy storage and generation system of claim 5 further comprising:
when the system is in the energy generation mode, the energy producing capability in the form of compressed gas stored in at least one of the at least two liquid vessels is released from that particular liquid vessel to a second liquid vessel containing the liquid;
the compressed gas moving the liquid from the second liquid vessel through the at least one hydroturbine generator into a third liquid vessel, the third liquid vessel being empty;
the electrical power generated by the at least one hydroturbine generator being fed to the integrating device;
the electric power being routed to the electrical power outlet or flowed back to the at least one external electrical power source when demand on the at least one external electrical power source is high.

7. The energy storage and generation system of claim 5 further comprising:
wherein, when the system is in the energy generation mode, the energy producing capability in the form of compressed gas stored in at least one of the at least two liquid vessels is released from the liquid vessel through the network of pipelines and then through the compressed gas outlet connection to supply compressed gas to power an external device.

* * * * *